(12) United States Patent
Chang et al.

(10) Patent No.: US 11,073,638 B2
(45) Date of Patent: Jul. 27, 2021

(54) OPTICAL IMAGE LENS ASSEMBLY AND PLASTIC MATERIAL THEREOF, IMAGE CAPTURING APPARATUS AND ELECTRONIC DEVICE

(71) Applicant: LARGAN PRECISION CO., LTD., Taichung (TW)

(72) Inventors: Pei-Chi Chang, Taichung (TW); Ming-Jui Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 57 days.

(21) Appl. No.: 15/694,900

(22) Filed: Sep. 4, 2017

(65) Prior Publication Data

US 2018/0067231 A1    Mar. 8, 2018

(30) Foreign Application Priority Data

Sep. 7, 2016 (TW) ................................ 105128964
Aug. 16, 2017 (TW) ................................ 106127817

(51) Int. Cl.
*G02B 1/04* (2006.01)
*C08K 5/3472* (2006.01)
(Continued)

(52) U.S. Cl.
CPC ............ *G02B 1/041* (2013.01); *C08K 5/3472* (2013.01); *C08K 5/3492* (2013.01); *G02B 5/208* (2013.01); *G02B 13/002* (2013.01)

(58) Field of Classification Search
CPC . G02B 1/00; G02B 1/04; G02B 1/041; G02B 5/208; G02B 5/22; G02B 5/223;
(Continued)

(56) References Cited

U.S. PATENT DOCUMENTS 6,011,648 A * 1/2000 Mukai .................. G02B 15/177
                                              359/362
6,187,844 B1   2/2001 Murata
(Continued)

FOREIGN PATENT DOCUMENTS

JP    H06331889 A    12/1994
JP    2005202056 A   7/2005
(Continued)

OTHER PUBLICATIONS

CIBA, Tinuvin 326, Benzotriazole UV Absorber, CAS No. 3896-11-5, Jun. 2002 (Year: 2002).*

*Primary Examiner* — Stephone B Allen
*Assistant Examiner* — Adam W Booher
(74) *Attorney, Agent, or Firm* — McClure, Qualey & Rodack, LLP

(57) ABSTRACT

An optical image lens assembly includes at least one optical lens element which is made of a plastic material and includes at least one short-wavelength light absorbing agent. The short-wavelength light absorbing agent is homogeneously mixed with the plastic material. The optical lens element including the short-wavelength light absorbing agent has refractive power, and at least one of the object-side surface and the image-side surface of the optical lens element including the short-wavelength light absorbing agent is aspheric.

25 Claims, 21 Drawing Sheets

(51) Int. Cl.
  *C08K 5/3492* (2006.01)
  *G02B 5/20* (2006.01)
  *G02B 13/00* (2006.01)

(58) Field of Classification Search
  CPC .... G02B 13/002; G02B 13/0025–0045; G02B 13/0015; G02B 13/18; C08K 5/3472; C08K 5/3477; C08K 5/3492
  See application file for complete search history.

(56) References Cited

U.S. PATENT DOCUMENTS

| | | | |
|---|---|---|---|
| 7,901,787 B2 | 3/2011 | Miyakawa | |
| 9,348,117 B1 | 5/2016 | Chang et al. | |
| 9,638,896 B2 | 5/2017 | Fukaya | |
| 2003/0197947 A1* | 10/2003 | Obama | G02B 5/208 359/676 |
| 2005/0046967 A1 | 3/2005 | Kosaka et al. | |
| 2007/0141355 A1 | 6/2007 | Kosaka et al. | |
| 2010/0118263 A1 | 5/2010 | Tamura et al. | |
| 2011/0069378 A1 | 3/2011 | Lin et al. | |
| 2011/0128494 A1* | 6/2011 | Takahashi | C08K 5/10 351/159.63 |
| 2013/0279026 A1* | 10/2013 | Asami | G02B 13/04 359/740 |
| 2015/0370094 A1* | 12/2015 | Hashimoto | G02B 5/208 351/159.62 |
| 2016/0004046 A1* | 1/2016 | Asami | G02B 13/04 359/713 |
| 2016/0319069 A1* | 11/2016 | Shigematsu | C08G 64/06 |

FOREIGN PATENT DOCUMENTS

| | | |
|---|---|---|
| JP | 4568462 B2 | 10/2010 |
| JP | 2014102408 A | 6/2014 |
| JP | 2014185325 A | 10/2014 |
| TW | 200525172 A | 8/2005 |
| TW | 200622283 A | 7/2006 |
| TW | I427318 B | 2/2014 |
| WO | 2012060449 A1 | 5/2012 |
| WO | 2014/208748 A1 | 12/2014 |
| WO | 2015/093093 A1 | 6/2015 |
| WO | 2015111316 A1 | 7/2015 |
| WO | 2016114362 A1 | 7/2016 |
| WO | 2014080561 A1 | 1/2017 |

* cited by examiner

OPTICAL IMAGE LENS ASSEMBLY AND PLASTIC MATERIAL THEREOF, IMAGE CAPTURING APPARATUS AND ELECTRONIC DEVICE

RELATED APPLICATIONS

This application claims priority to Taiwan Application Serial Number 105128964, filed Sep. 7, 2016, and Taiwan Application Serial Number 106127817, filed Aug. 16, 2017, which are herein incorporated by reference.

BACKGROUND

Technical Field

The present disclosure relates to an optical image lens assembly and a plastic material thereof, and an image capturing apparatus. More particularly, the present disclosure relates to a compact optical image lens assembly and a plastic material thereof, and an image capturing apparatus applicable to electronic devices.

Description of Related Art in recent years, the development of compact photographing lens systems employed in mobile products is vigorous. For satisfying the needs of miniaturization, aspheric manufacturing and mass production, the optical lens elements of the photographing lens system are made of a plastic material.

However, when the optical lens elements are made of the plastic material, the optical lens elements cannot effectively against the damage caused by short-wavelength lights, such as ultraviolet (UV) lights or high-energy blue lights, so that the deteriorations of the optical lens elements occur. Accordingly, the durability and the image quality of the photographing lens systems are declined.

For solving the aforementioned problem, a lens coating technology is developed. By the lens coating technology, at least one layer of film which can reflect UV lights is coated on the optical lens element. The damage caused by the UV lights can be reduced. However, the cost of coating films on miniature optical lens element is high. Moreover, the technical difficulty for obtaining an optical lens element with a uniform and ideal film is excessively high, which is unfavorable for enhancing the yield rate.

Therefore, the relevant industry is still seeking a plastic optical lens element which can effectively eliminate short-wavelength lights, so that the durability and the image quality of the photographing lens systems can be enhanced. Also, the photographing lens systems can be more compact by adopting the plastic optical lens, and is favorable to be applied to mobile products. Furthermore, the shortcomings of high cost and high technical difficulty caused by the lens coating technology can be avoided.

SUMMARY

According to one aspect of the present disclosure, an optical image lens assembly includes, in order from an object side to an image side, at least one optical lens element which is made of a plastic material and includes at least one short-wavelength light absorbing agent. The short-wavelength light absorbing agent is homogeneously mixed with the plastic material. The optical lens element including the short-wavelength light absorbing agent has refractive power, and at least one of an object-side surface and an image-side surface of the optical lens element including the short-wavelength light absorbing agent is aspheric. When an average transmittance in a wavelength range of 350 nm-400 nm of the optical lens element including the short-wavelength light absorbing agent is T3540 and an average transmittance in a wavelength range of 400 nm-450 nm of the optical lens element including the short-wavelength light absorbing agent is T4050, the following conditions are satisfied:

$T3540 \leq 40\%$; and $T4045 < 90\%$.

According to another aspect of the present disclosure, an optical image lens assembly includes, in order from an object side to an image side, at least one optical lens element which is made of a plastic material and includes at least one short-wavelength light absorbing agent. The short-wavelength light absorbing agent is homogeneously mixed with the plastic material. The optical lens element including the short-wavelength light absorbing agent has refractive power, and at least one of an object-side surface and an image-side surface of the optical lens element including the short-wavelength light absorbing agent is aspheric. When an average transmittance in a wavelength range of 350 nm-400 nm of the optical lens element including the short-wavelength light absorbing agent is T3540, an average transmittance in a wavelength range of 400 nm-450 nm of the optical lens element including the short-wavelength light absorbing agent is T4050, a maximum thickness of the optical lens element including the short-wavelength light absorbing agent is TKmax, and a minimum thickness of the optical lens element including the short-wavelength light absorbing agent is TKmim, the following conditions are satisfied:

$T3540 \leq 40\%$;

$T4045 < 90\%$; and $1.0 < TKmax/TKmin \leq 2.0$.

According to yet another aspect of the present disclosure, an image capturing apparatus includes the optical image lens assembly according to the aforementioned aspect and an image sensor, wherein the image sensor is disposed on an image surface of the optical image lens assembly.

According to yet another aspect of the present disclosure, an electronic device, which is a mobile photographing device, includes the image capturing apparatus according to the aforementioned aspect.

According to further another aspect of the present disclosure, an electronic device, which is a portable device, includes the image capturing apparatus according to the aforementioned aspect.

According to further another aspect of the present disclosure, a plastic material is used to manufacture the optical lens element of the optical image lens assembly according to the aforementioned aspect. When an average transmittance in a wavelength range of 400 nm-500 nm of the optical lens element made by the plastic material is T4050, an average transmittance in a wavelength range of 500 nm-580 nm of the optical lens element made by the plastic material is T5058, and an average transmittance in a wavelength range of 580 nm-700 nm of the optical lens element made by the plastic material is T5870, the following conditions are satisfied:

$20\% \leq T4050$;

$60\% \leq T5058$; and $60\% \leq T5870$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
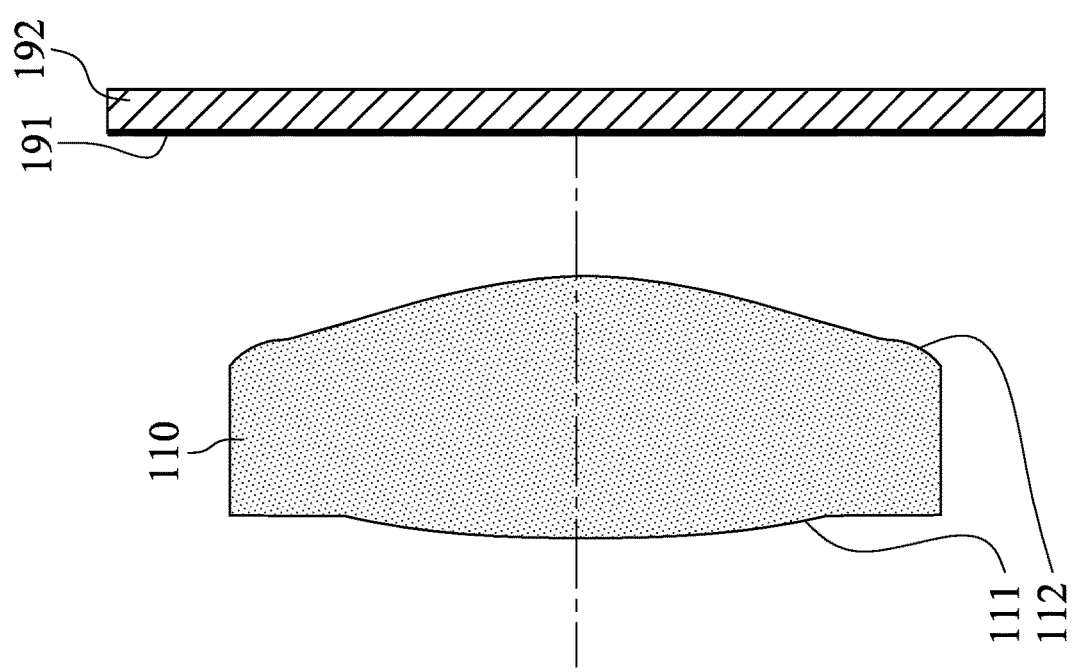
FIG. 1 is a schematic view of an image capturing apparatus according to the 1st embodiment of the present disclosure.

An optical image lens assembly includes, in order from an object side to an image side, at least one optical lens element with refractive power. The focal length of the optical image lens assembly is positive, that is, the entire optical image lens assembly has positive refractive. Therefore, lights can be effectively converged so as to be focused to form an image.

The optical lens element with refractive power (positive refractive power or negative refractive power) has an object-side surface being convex or concave in a paraxial region thereof and an image-side surface being convex or to concave in a paraxial region thereof. At least one of the object-side surface and the image-side surface of the optical lens element is aspheric, and the optical lens element is made of a plastic material. Therefore, the surface shape of the optical lens element can be designed according to practical needs, such as eliminating aberrations so as to enhance the image quality. Moreover, aspheric surfaces can satisfy the demand of miniaturization design, and a proper plastic material can reduce a fluorescence problem and can meet the purpose of mass production.

The optical image lens assembly can include only one optical lens element or a plurality of optical lens elements. When the optical image lens assembly only includes one optical lens element, the only one optical lens element includes at least one short-wavelength light absorbing agent. When the optical image lens assembly includes a plurality of optical lens elements, at least one of the optical lens elements includes at least one short-wavelength light absorbing agent. The short-wavelength light absorbing agent is homogeneously mixed with the plastic material. The optical lens element including the short-wavelength light absorbing agent has refractive power, and at least one of an object-side surface and an image-side surface of the optical lens element including the short-wavelength light absorbing agent is aspheric. Therefore, an extra short-wavelength light absorbing element/filter is not required for the optical image lens assembly, or the number of the short-wavelength light absorbing element/filter can be reduced, so that the back focal space of the optical image lens assembly can be more flexible to design. Accordingly, the optical image lens assembly can be more compact, and is favorable to be applied to mobile products. Moreover, instead of featuring the optical lens element with the short-wavelength light absorbing capability by the lens coating technology, the short-wavelength light absorbing agent is homogeneously mixed with the plastic material of the optical lens element, so that the shortcomings of high cost and high technical difficulty caused by the lens coating technology can be avoided.

When an average transmittance in a wavelength range of 350 nm-400 nm of the optical lens element including the short-wavelength light absorbing agent is T3540 and an average transmittance in a wavelength range of 400 nm-450 nm of the optical lens element including the short-wavelength light absorbing agent is T4045, the following conditions are satisfied: T3540≤40%, and T4045<90%. Therefore, the optical lens element including the short-wavelength light absorbing agent can effectively absorb the short-wavelength light, such as UV light and blue light, such that the image of the optical lens assembly is dearer and the contrast of the image is increased. Moreover, the purple fringing of the image can be effective prevented to enhance the image quality by eliminating the blue light. Because an image interference problem, also called fluorescent problem, will be formed owing to the low-energy blue light released by the short-wavelength light absorbing agent after the short-wavelength light absorbing agent absorbing high-energy UV light, the short-wavelength light absorbing agent used in the present disclosure can reduce or prevent the fluorescent problem; consequently, the optical lens assembly can have good imaging quality. Alternatively, the following condition can be satisfied: T3540≤30%. Alternatively, the following condition can be satisfied: T3540≤20%. Alternatively, the following condition can be satisfied: T4045≤80%. Alternatively, the following condition can be satisfied: T4045≤70%.

In the optical lens assembly according to the present disclosure, transmittances of a starting point and an end point of a specific wavelength range are included in the calculation of the average transmittance in a specific wavelength range. For example, when calculating the average transmittance in the wavelength range of 350 nm-400 nm, the transmittance corresponding to 350 nm, the transmittance corresponding to 351 nm, and the transmittances corresponding to each of the wavelengths from 352 nm to 400 nm are summed and averaged. The basis wavelength unit is not limited to 1 nm.

The short-wavelength light absorbing agent refers to a material which can absorb short-wavelength lights. The short-wavelength light absorbing agent according to the present disclosure can absorb UVB (in a wavelength range of 280 nm-315 nm) and UVA (in a wavelength range of 316 nm-400 nm). Therefore, the deterioration of the optical lens element can be prevented, and the durability and the image quality of the optical image lens assembly can be enhanced. Moreover, the short-wavelength light absorbing agent according to the present disclosure can also absorb high-energy blue lights (in a wavelength range of 401 nm-434 nm). Therefore, the high-energy blue lights entering into the optical image lens assembly can be blocked or reduced, and the purple fringing of the image can be prevented, which can further enhance the image quality.

In the optical image lens assembly according to the present disclosure, the short-wavelength light absorbing agent can be an organic compound, such that the transparency of the optical lens element can be maintained. The short-wavelength light absorbing agent can be a benzotriazole compound. The benzotriazole compound has an excellent absorbing capability for short-wavelength lights, so that the absorption effect in the wavelength range of 280 nm-400 nm can be enhanced. The benzotriazole compound refers to a compound containing a benzotriazole functional group which is substituted or unsubstituted. The unsubstituted benzotriazole functional group has a structure represented by Formula (i):

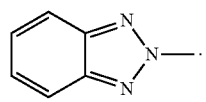

(i)

The substituted benzotriazole functional group refers that at least one of the hydrogen atoms can be substituted by other group, such as an alkyl group or a halogen atom. The alkyl group can be but is not limited to a C1-C4 alkyl group. The halogen atom can be but is not limited to F, Cl or Br.

In the optical image lens assembly according to the present disclosure, the short-wavelength light absorbing agent can be selected from 2-(2'-hydroxy-3'-t-butyl-5'-methylphenyl)-5-chlorobenzotriazole, 2-(2'-hydroxy-5'-t-octylphenyl)benzotriazole, 2,2'-methylenebis[6-(2H-benzotriazol-2-yl)-4-(1,1,3,3-tetramethylbutyl)phenol], 2,2'-(1,4-phenylene)bis(4H-3,1-benzoxazin-4-one) or a mixture thereof. That is, the aforementioned short-wavelength light absorbing agents can be used separately or simultaneously. Therefore, the high-energy UV lights can be effectively absorbed, and the fluorescence problem can be avoided. Specifically, some plastic materials have the fluorescence problem after irradiation with the UV lights. Because the short-wavelength light absorbing agents can absorb the UV lights, the fluorescence problem caused by the plastic materials can be eliminated by adding the short-wavelength light absorbing agent. When the fluorescence problem is eliminated, the high image quality can be maintained. The fluorescence problem refers the phenomenon that a material emits blue lights (lower energy) after irradiation with UV lights (higher energy), and the image is interfered by the blue lights. Moreover, the CAS (Chemical Abstracts Service) number of 2-(2'-hydroxy-3'-t-butyl-5'-methylphenyl)-5-chlorobenzotriazole is 3896-11-5, the CAS number of 2-(2'-hydroxy-5'-t-octylphenyl)benzotriazole is 3147-75-9, the CAS number of 2,2'-methylenebis[6-(2H-benzotriazol-2-yl)-4-(1,1,3,3-tetramethylbutyl)phenol] is 103597-45-1, and the CAS number of 2,2'-(1,4-phenylene)bis(4H-3,1-benzoxazin-4-one) is 18600-59-4.

In the optical image lens assembly according to the present disclosure, the short-wavelength light absorbing agent can be but is not limited to UV-326, UV-329, UV-360, UV-3638 or UV-390. More specifically, the short-wavelength light absorbing agent can be but is not limited to the product produced by BASF chemical Co., Ltd. with the commercial name of Tinuvin 326, Tinuvin 477 or Tinuvin Carboprotect. Alternatively, the short-wavelength light absorbing agent can be but is not limited to the product produced by EUTEC chemical Co., Ltd. with the commercial name of Eusorb UV-390, Eusorb UV-1990, Eusorb UV-1995, Eusorb UV-360 or Eusorb UV-3638. Alternatively, the short-wavelength light absorbing agent can be but is not limited to the product produced by GO YEN CHEMICAL INDUSTRIAL Co., Ltd. with the commercial name of Goyenchem-BL390, Goyenchem-BL326 or Goyenchem-BL475. Alternatively, the short-wavelength light absorbing agent can be but is not limited to the product produced by Deltachem (Qingdao) Co., Ltd. with the commercial name of Omnistab 46, Omnistab 47 or Omnistab 93. Alternatively, the short-wavelength light absorbing agent can be but is not limited to the product produced by Everlight Chemical Industrial Corporation with the commercial name of ST15042 or ST13058. Alternatively, the short-wavelength light absorbing agent can be but is not limited to the product produced by Sumika Chemtex Co., Ltd. with the commercial name of Sumisorb 300 or Sumisorb 340. Alternatively, the short-wavelength light absorbing agent can be but is not limited to the product produced by ADEKA Co., Ltd. with the commercial name of LA-31. Alternatively, the short-wavelength light absorbing agent can be but is not limited to the product produced by JOHOKU CHEMICAL Co., Ltd. with the commercial name of JF-79, JF-83 or JF-832. Alternatively, the short-wavelength light absorbing agent can be but is not limited to the product produced by CBC Co., Ltd. with the commercial name of KEMISORB 73, KEMISORB 279 or KEMISORB 500. Alternatively, the short-wavelength light absorbing agent can be but is not limited to the product produced by Synchemer Co., Ltd. with the commercial name of Synsorb-430. Alternatively, the short-wavelength light absorbing agent can be but is not limited to the product produced by Richfortune Chemicals Co., Ltd. with the commercial name of UV-326 or RFC-Blue 47.

In the optical image lens assembly according to the present disclosure, the plastic material can be thermoplastic, such that the efficiency and yield rate for manufacturing the optical lens element can be increased. The plastic material can be selected from polycarbonate (PC), polyetherimide (PEI), polymethylmethacrylate (PMMA), cyclo olefin copolymer (COC), cyclo olefin polymer (COP), polyethylene terephthalate (PET), acrylonitrile-butadiene-styrene copolymer (ABS), polystyrene (PS), polyurethane (PUR), methylmethacrylate-styrene copolymer (MS), polysulfone (PSU), epoxy, silicone or a mixture thereof. That is, the aforementioned plastic materials can be used separately or simultaneously. Therefore, the plastic material is proper, which can enhance the manufacturing stability and the molding accuracy, and reduce the fluorescence problem of the optical lens element.

In the optical image lens assembly according to the present disclosure, the optical lens element including the short-wavelength light absorbing agent is made by an injection molding process; hence, the manufacturing efficiency can be increased.

In the optical image lens assembly according to the present disclosure, when an average transmittance of the optical lens element including the short-wavelength light absorbing agent in a wavelength range of 400 nm-500 nm (blue visible light region) is T4050, the following condition is satisfied: 65%≤T4050. Therefore, blue color shift of the image can be prevented. Alternatively, the following condition can be satisfied: 75%≤T4050. Alternatively, the following condition can be satisfied: 85%≤T4050. Alternatively, the following condition can be satisfied: 90%≤T4050.

In the optical image lens assembly according to the present disclosure, when an average transmittance of the optical lens element including the short-wavelength light absorbing agent in a wavelength range of 500 nm-580 nm (green visible light region) is T5058, the following condition is satisfied: 85%≤T5058. Therefore, green color shift of the image can be prevented. Alternatively, the following condition can be satisfied: 90%≤T5058.

In the optical image lens assembly according to the present disclosure, when an average transmittance of the optical lens element including the short-wavelength light absorbing agent in a wavelength range of 580 nm-700 nm (red visible light region) is T5870, the following condition is satisfied: 85%≤T5870. Therefore, red color shift of the image can be prevented. Alternatively, the following condition can be satisfied: 85%≤T5870. Alternatively, the following condition can be satisfied: 90%≤T5870.

In the optical image lens assembly according to the present disclosure, when an average transmittance of the optical lens element including the short-wavelength light absorbing agent in a wavelength range of 400 nm-420 nm is T4042, the following condition is satisfied: T4042≤50%. Therefore, red color shift of the image can be prevented. Alternatively, the following condition can be satisfied: T4042≤40%. Alternatively, the following condition can be satisfied: T4042≤30%.

In the optical image lens assembly according to the present disclosure, a number of the optical lens elements can be greater than or equals to two, and at least two of the optical lens elements include the short-wavelength light absorbing agent. Therefore, the absorption effect for short-wavelength lights can be effectively enhanced, and the image quality and the miniaturization effect can be further improved. Alternatively, a number of the optical lens elements can be greater than or equals to three, and at least three of the optical lens elements include the short-wavelength light absorbing agent. Alternatively, a number of the optical lens elements can be greater than or equals to four, and at least four of the optical lens elements include the short-wavelength light absorbing agent. Alternatively, a number of the optical lens elements can be greater than or equals to five, and at least five of the optical lens elements include the short-wavelength light absorbing agent.

In the optical image lens assembly according to the present disclosure, the optical lens element closest to the object side can include the short-wavelength light absorbing agent. Therefore, the short-wavelength lights can be immediately absorbed after entering into the optical image lens assembly, so that the image interfered by the reflective lights of the short-wavelength lights can be prevented.

In the optical image lens assembly according to the present disclosure, when a central thickness of the optical lens element including the short-wavelength light absorbing agent is CTa, the following condition can be satisfied: CTa≤1.50 mm. Therefore, the central thickness of the optical lens element is proper, and a stable absorption effect for the short-wavelength lights can be maintained. Accordingly, the filter effect and the stability of the image quality can be ensured. Alternatively, the following condition can be satisfied: 0.10 mm≤CTa≤1.00 mm. Alternatively, the following condition can be satisfied: 0.10 mm≤CTa≤0.80 mm. Alternatively, the following condition can be satisfied: 0.15 mm≤CTa≤0.50 mm.

In the optical image lens assembly according to the present disclosure, when a glass transformation temperature of the plastic material is Tg, the following condition is satisfied: 131° C.≤Tg≤165° C. Therefore, the yield rate and efficiency of the injection molding for the optical lens element can be increased.

In the optical image lens assembly according to the present disclosure, when a transmittance of the optical lens element including the short-wavelength light absorbing agent is T, the following condition is satisfied: 90%≤T. Therefore, the optical lens element can have high transparency to increase the luminous flux of the optical lens element. Alternatively, the following condition can be satisfied: 90%≤T≤93%.

In the optical image lens assembly according to the present disclosure, when an Abbe number of the optical lens element including the short-wavelength light absorbing agent is V, the following condition is satisfied: 15.0≤V≤37.5. Therefore, the aberrations of the optical lens element can be corrected.

In the optical image lens assembly according to the present disclosure, when a haze value of the optical lens element including the short-wavelength light absorbing agent is Hz, the following condition is satisfied: 0.3%≤Hz≤0.5%. Therefore, the transparency of the optical lens element can be increased.

In the optical image lens assembly according to the present disclosure, when a refractive index of the optical lens element including the short-wavelength light absorbing agent is N, the following condition is satisfied: 1.6≤N. Therefore, the optical lens element can obtain high refractive index characteristic, and it is favorable for correcting the chromatic aberration.

In the optical image lens assembly according to the present disclosure, when a maximum thickness of the optical lens element including the short-wavelength light absorbing agent is TKmax, and a minimum thickness of the optical lens element including the short-wavelength light absorbing agent is TKmin, the following condition is satisfied: 1.0<TKmax/TKmin≤2.0. The abovementioned maximum thickness and minimum thickness are the thicknesses measured along a direction parallel to the optical axis, and TKmax/TKmin means the ratio between the maximum thickness and the minimum thickness of the same optical lens element. Therefore, because the optical image lens assembly according to the present disclosure includes at least one optical lens element including the short-length absorbing agent, the optical lens element including the short-length absorbing agent can effectively absorb the short-wavelength light, such as UV light and blue light. Accordingly, the image of the optical image lens assembly is clearer, and the contrast and brilliance of the image are improved; moreover, the purple fringing of the image can be prevented by eliminating the blue light. Finally, the image quality is improved. In addition, the short-wavelength light absorbing agent used in the present disclosure can reduce or prevent the fluorescent problem, such that the high image quality of the optical image lens assembly can be maintained. As a result, the back focal space can be more flexible to design. Consequently, the optical image lens assembly can be more compact. Alternatively, the following condition can be satisfied: 1.0<TKmax/TKmin≤1.8. Alternatively, the following condition can be satisfied: 1.0<TKmax/TKmin≤1.6. Alternatively, the following condition can be satisfied: 1.05≤TKmax/TKmin≤1.6. Alternatively, the following condition can be satisfied: 1.07≤TKmax/TKmin≤1.6.

In the optical image lens assembly according to the present disclosure, a sum of a central thickness of the optical lens element including the short-wavelength light absorbing agent is sumCTa and the following condition can be satisfied: 0.10 mm≤sumCTa≤40.0 mm. Therefore, the miniaturization of the optical image lens assembly and the absorption effect for short-wavelength lights can be balanced. Alternatively, the following condition can be satisfied: 0.10 mm≤sumCTa≤30.0 mm. Alternatively, the following condition can be satisfied: 0.10 mm≤sumCTa≤20.0 mm. Alternatively, the following condition can be satisfied: 0.10 mm≤sumCTa≤10.0 mm. Alternatively, the following condition can be satisfied: 0.15 mm≤sumCTa≤5.0 mm. Alternatively, the following condition can be satisfied: 0.15 mm≤sumCTa≤1.0 mm. Specifically, the optical image lens assembly can include only one optical lens element including the short-wavelength light absorbing agent or a plurality of optical lens elements including the short-wavelength light absorbing agent. When the optical image lens assembly only includes one optical lens element including the short-wavelength light absorbing agent, sumCTa is a central thickness of the optical lens element including the short-wavelength light absorbing agent. When the optical image lens assembly includes a plurality of optical lens elements including the short-wavelength light absorbing agent, sumCTa is a sum of central thicknesses of the plurality of optical lens elements including the short-wavelength light absorbing agent.

In the optical image lens assembly according to the present disclosure, when a sum of a central thickness of the optical lens element including the short-wavelength light absorbing agent is sumCTa and a sum of a central thickness of the optical lens element is sumCT, the following condition can be satisfied: sumCTa/sumCT≤1. Therefore, the miniaturization of the optical image lens assembly and the absorption effect for short-wavelength lights can be balanced. Alternatively, the following condition can be satisfied: sumCTa/sumCT≤0.8. Alternatively, the following condition can be satisfied: sumCTa/sumCT≤0.4. Alternatively, the following condition can be satisfied: sumCTa/sumCT≤0.2.

In the optical image lens assembly according to the present disclosure, a number of the optical lens elements is greater or equal to four, and at least four of the optical lens elements have refractive power. Therefore, the image quality of the optical image lens assembly having a plurality of optical lens elements is batter, and the high pixel resolution and high quality requirement of photographing are satisfied. Alternatively, a number of the optical lens elements is greater or equal to five, and at least five of the optical lens elements have refractive power. Alternatively, a number of the optical lens elements is greater or equal to six, and at least six of the optical lens elements have refractive power. Alternatively, a number of the optical lens elements is greater or equal to seven, and at least seven of the optical lens elements have refractive power. Alternatively, a number of the optical lens elements is greater or equal to eight, and at least eight of the optical lens elements have refractive power.

In the optical image lens assembly according to the present disclosure, the optical image lens assembly includes a plurality of the optical lens element, and the optical lens element including the short-wavelength light absorbing agent is a second optical lens element or a third optical lens element among the optical lens elements in order from an object side to an image side. Therefore, the IR-absorbing effect is sufficient to prevent the image sensor from returning a response owing to the exposure of IR; moreover, the color shift and image interference can be avoided. Alternatively, the second optical lens element includes the short-wavelength light absorbing agent. Alternatively, the third optical lens element includes the short-wavelength light absorbing agent.

In the optical image lens assembly according to the present disclosure, when a number of the optical lens elements including the short-wavelength light absorbing agent is greater than or equals to two, and the maximum of maximum effective diameters of the optical lens elements including the short-wavelength light absorbing agent is φmax, the following condition can be satisfied: 0.50 mm≤φmax≤60.00 mm. Therefore, the maximum effective diameter of the optical lens element is proper. That is, when the maximum effective diameter is close to the upper limit value, the maximum effective diameter is sufficient for being applied to electronic devices requiring a larger field of view, such as vehicle photographing system, sports photographing equipment and virtual reality device. When the maximum effective diameter is close to the lower limit value, the optical image lens assembly is favorable to be miniaturized, which is favorable for being applied to thin and compact mobile devices. Moreover, when the maximum effective diameter is in the aforementioned range, the molding stability of the optical lens element during the injection molding process can be enhanced, and the residual stress can be reduced. Alternatively, the following condition can be satisfied: 0.50 mm≤φmax≤60.0 mm. Alternatively, the following condition can be satisfied: 0.50 mm≤φmax≤15.00 mm. Alternatively, the following condition can be satisfied: 0.50 mm≤φmax≤8.00 mm. Alternatively, the following condition can be satisfied: 0.50 mm≤max≤5.00 mm. Specifically, the optical image lens assembly can include only one optical lens element including the short-wavelength light absorbing agent or a plurality of optical lens elements including the short-wavelength light absorbing agent. When the optical image lens assembly only includes one optical lens element including the short-wavelength light absorbing agent, φmax is a maximum effective diameter of the optical lens element including the short-wavelength light absorbing agent. When the optical image lens assembly includes a plurality of optical lens elements including the short-wavelength light absorbing agent, φmax is a maximum of maximum effective diameters of the plurality of optical lens elements including the short-wavelength light absorbing agent.

In the optical image lens assembly according to the present disclosure, when a maximum of maximum effective diameter of the optical lens element including the short-wavelength light absorbing agent is φmax, and a sum of central thickness of the optical lens element including the short-wavelength light absorbing agent is sumCTa, the following condition can be satisfied: 0.10≤φmax/sumCTa. Therefore, the miniaturization of the optical image lens assembly and the absorption effect for short-wavelength lights can be balanced. Moreover, the manufacturing performance and the finished product quality of the plastic molding can be enhanced. Alternatively, the following condition can be satisfied: 0.40≤φmax/sumCTa≤10.00. Alternatively, the following condition can be satisfied: 0.80≤max/sumCTa≤10.00. Alternatively, the following condition can be satisfied: 1.00≤φmax/sumCTa≤8.00. Alternatively, the following condition can be satisfied: 2.00≤φmax/sumCTa≤6.00.

In the optical image lens assembly according to the present disclosure, when a maximum wavelength correspondent to a 50% transmittance of the optical lens element including the short-wavelength light absorbing agent is WLT50, the following condition can be satisfied: WLT50≤435 nm. Therefore, the problem of purple fringing can be reduced, and the color shift can be prevented, so that the true color of the image can be maintained. Alternatively, the following condition can be satisfied: WLT50≤430 nm. Alternatively, the following condition can be satisfied: WLT50≤428 nm. Alternatively, the following condition can be satisfied: WLT50≤425 nm. Alternatively, the following condition can be satisfied: 346 nm≤WLT50≤420 nm.

According to the present disclosure, an image capturing apparatus is provided. The image capturing apparatus includes the optical image lens assembly and an image sensor, wherein the image sensor is disposed on an image surface of the optical image lens assembly. The optical image lens assembly includes at least one of the optical lens elements including at least one short-wavelength light absorbing agent. Therefore, the short-wavelength lights can be effectively absorbed, so that the image quality can be enhanced, and the back focal space can be more flexible to design. Accordingly, the image capturing apparatus can be more compact, and is favorable to be applied to mobile products. Preferably, the image capturing apparatus can further include a barrel member, a holding member or a combination thereof.

According to the present disclosure, an electronic device, such as a mobile photographing device or a portable device, is provided. The electronic device includes the image capturing apparatus. Therefore, the short-wavelength lights can be effectively absorbed, so that the image quality can be enhanced, and the back focal space may be more flexible to design. Accordingly, the electronic device can be more compact. Preferably, the electronic device can further include but not limited to a control unit, a display, a storage unit, a random access memory unit (RAM), a read only memory unit (ROM) or a combination thereof.

According to the present disclosure, a plastic material which is for manufacturing the abovementioned optical lens element of the optical image lens assembly is provided. The optical lens element made by the plastic material is the optical lens element including the short-wavelength light absorbing agent. When an average transmittance in a wavelength range of 400 nm-500 nm of the optical lens element made by the plastic material is T4050, an average transmittance in a wavelength range of 500 nm-580 nm of the optical lens element made by the plastic material is T5058, and an average transmittance in a wavelength range of 580 nm-700 nm of the optical lens element made by the plastic material is T5870, the following conditions are satisfied: 20%≤T4050; 60%≤T5058; and 60%≤T5870. Therefore, the blue color shift, the green color shift and the red color shift can be prevented. Alternatively, the following conditions can be satisfied: 65%≤T4050; 85%≤T5058; and 85%≤T5870.

According to the above description of the present disclosure, the following specific embodiments are provided for further explanation.

1st Embodiment

FIG. 1 is a schematic view of an image capturing apparatus according to the 1st embodiment of the present disclosure. In FIG. 1, the image capturing apparatus includes an optical image lens assembly (its reference numeral is omitted) and an image sensor 192. The optical image lens assembly includes, in order from an object side to an image side, a first optical lens element 110 and an image surface 191, wherein the image sensor 192 is disposed on the image surface 191 of the optical image lens assembly. The optical image lens assembly can selectively include other elements, such as an aperture stop (not shown) or an IR-cut filter (not shown). The other elements are conventional and will not be described herein.

The first optical lens element 110 with positive refractive power has an object-side surface 111 being convex in a paraxial region thereof and an image-side surface 112 being convex in a paraxial region thereof, and has the object-side surface 111 and the image-side surface 112 being both aspheric. The first optical lens element 110 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the first optical lens element 110 including the short-wavelength light absorbing agent is CT1, the following condition is satisfied: CT1=3.92 mm (that is, CT1 is CTa of the first optical lens element 110). When a maximum wavelength correspondent to a 50% transmittance of the first optical lens element 110 including the short-wavelength light absorbing agent is WLT50, the following condition can be satisfied: WLT50≤435 nm. When an average transmittance in a wavelength range of 350 nm-400 nm of the first optical lens element 110 including the short-wavelength light absorbing agent is T3540, an average transmittance in a wavelength range of 400 nm-450 nm of the first optical lens element 110 including the short-wavelength light absorbing agent is T4045, an average transmittance in a wavelength range of 400 nm-500 nm of the first optical lens element 110 including the short-wavelength light absorbing agent is T4050, an average transmittance in a wavelength range of 500 nm-580 nm of the first optical lens element 110 including the short-wavelength light absorbing agent is T5058, and an average transmittance in a wavelength range of 580 nm-700 nm of the first optical lens element 110 including the short-wavelength light absorbing agent is T5870, the following conditions can be satisfied: T3540≤40%; T4045<90%; 65%≤T4050; 85%≤T5058; and 85%≤T5870.

In the optical image lens assembly of the 1st embodiment, a maximum thickness of the optical lens element including the short-wavelength light absorbing agent is TKmax and a minimum thickness of the optical lens element including the short-wavelength light absorbing agent is TKmin. In the 1st embodiment, the first optical lens element 110 includes the short-wavelength light absorbing agent, and the following conditions are satisfied: TKmax=3.92 mm, TKmin=2.25 mm, and TKmax/TKmin=1.75.

In the optical image lens assembly of the 1st embodiment, a sum of central thickness of the optical lens element including the short-wavelength light absorbing agent is sumCTa (in the 1st embodiment, only the first optical lens element 110 includes the short-wavelength light absorbing agent, that is, sumCTa equals to a central thickness of the first optical lens element 110), a sum of central thickness of the optical lens element is sumCT (in the 1st embodiment, sumCT equals to the central thickness of the first optical lens element 110), and a maximum of maximum effective diameters of the optical lens elements including the short-wavelength light absorbing agent is φmax (in the 1st embodiment, φmax equals to a maximum effective diameter of the first optical lens element 110), the following conditions are satisfied: sumCTa=3.92 mm; sumCT=3.92 mm; φmax=10.64 mm; sumCTa/sumCT=1; and φmax/sumCTa=2.71.

The details of the plastic material and the short-wavelength light absorbing agent have been mentioned above, and are not repeated herein.

In the first optical lens element 110, the dots therein represent the short-wavelength light absorbing agent, and the blank portion therein represents the plastic material, which intends to express that the short-wavelength light absorbing agent is homogeneously mixed with the plastic material. The size of the dots and the distribution of the dots have no special meanings. For example, the size of the dots and the distribution of the dots do not represent the particle size of the short-wavelength light absorbing agent, the concentration of the short-wavelength light absorbing agent, or the kind of the short-wavelength light absorbing agent. The size of the dots and the distribution of the dots also have no special meanings in the following embodiments. Therefore, an explanation in this regard will not be provided again.

2nd Embodiment

Figure 2:
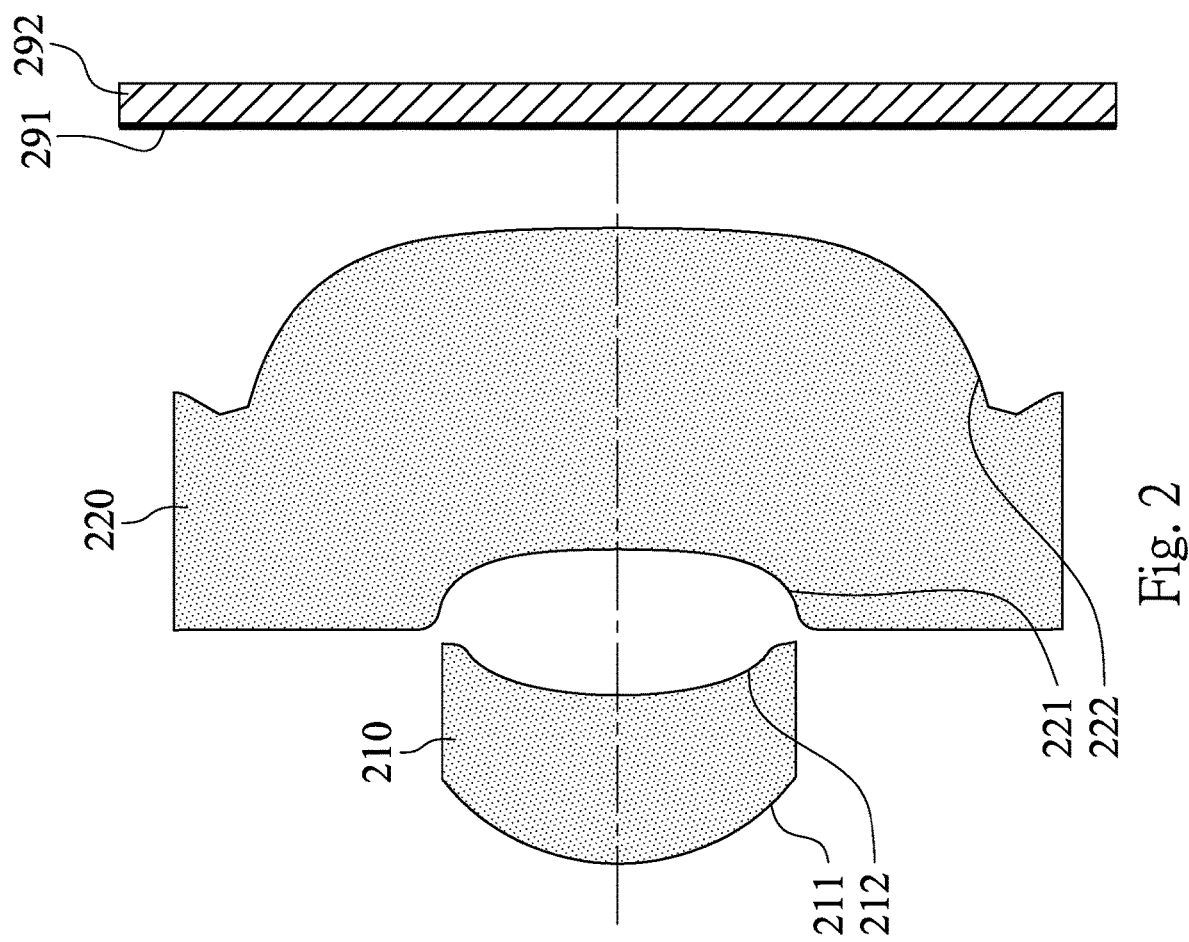
FIG. 2 is a schematic view of an image capturing apparatus according to the 2nd embodiment of the present disclosure.

FIG. 2 is a schematic view of an image capturing apparatus according to the 2nd embodiment of the present disclosure. In FIG. 2, the image capturing apparatus includes an optical image lens assembly (its reference numeral is omitted) and an image sensor 292. The optical image lens assembly includes, in order from an object side to an image side, a first optical lens element 210, a second optical lens element 220 and an image surface 291, wherein the image sensor 292 is disposed on the image surface 291 of the optical image lens assembly. The optical image lens assembly can selectively include other elements, such as an aperture stop (not shown) or an IR-cut filter (not shown). The other elements are conventional and will not be described herein.

The first optical lens element 210 with positive refractive power has an object-side surface 211 being convex in a paraxial region thereof and an image-side surface 212 being concave in a paraxial region thereof, and has the object-side surface 211 and the image-side surface 212 being both aspheric. The first optical lens element 210 is made of a plastic material (its reference numeral is omitted), and includes at least one short-wavelength light absorbing agent. The short-wavelength light absorbing agent is homogeneously mixed with the plastic material. When a central thickness of the first optical lens element 210 including the short-wavelength light absorbing agent is CT1, the following condition is satisfied: CT1=0.59 mm (that is, CT1 is CTa of the first optical lens element 210). When a maximum wavelength correspondent to a 50% transmittance of the first optical lens element 210 including the short-wavelength light absorbing agent is WLT50, the following condition can be satisfied: WLT50≤435 nm. When an average transmittance in a wavelength range of 350 nm-400 nm of the first optical lens element 210 including the short-wavelength light absorbing agent is T3540, an average transmittance in a wavelength range of 400 nm-450 nm of the first optical lens element 210 including the short-wavelength light absorbing agent is T4045, an average transmittance in a wavelength range of 400 nm-500 nm of the first optical lens element 210 including the short-wavelength light absorbing agent is T4050, an average transmittance in a wavelength range of 500 nm-580 nm of the first optical lens element 210 including the short-wavelength light absorbing agent is T5058, an average transmittance in a wavelength range of 580 nm-700 nm of the first optical lens element 210 including the short-wavelength light absorbing agent is T5870, and an average transmittance in a wavelength range of 400 nm-420 nm of the first optical lens element 210 including the short-wavelength light absorbing agent is T4042, the following conditions can be satisfied: T3540≤40%; T4045<90%; 65%≤T4050; 85%≤T5058; 85%≤T5870; and T4042≤50%.

The second optical lens element 220 with negative refractive power has an object-side surface 221 being concave in a paraxial region thereof and an image-side surface 222 being convex in a paraxial region thereof, and has the object-side surface 221 and the image-side surface 222 being both aspheric. The second optical lens element 220 is made of a plastic material (Its reference numeral is omitted), and includes at least one short-wavelength light absorbing agent (its reference numeral is omitted). The short-wavelength light absorbing agent is homogeneously mixed with the plastic material. When a central thickness of the second optical lens element 220 including the short-wavelength light absorbing agent is CT2, the following condition is satisfied: CT2=1.13 mm (that is, CT2 is CTa of the second optical lens element 220). When a maximum wavelength correspondent to a 50% transmittance of the second optical lens element 220 including the short-wavelength light absorbing agent is WLT50, the following condition can be satisfied: WLT50≤435 nm. When an average transmittance in a wavelength range of 350 nm-400 nm of the second optical lens element 220 including the short-wavelength light absorbing agent is T3540, an average transmittance in a wavelength range of 400 nm-450 nm of the second optical lens element 220 including the short-wavelength light absorbing agent is T4045, an average transmittance in a wavelength range of 400 nm-500 nm of the second optical lens element 220 including the short-wavelength light absorbing agent is T4050, an average transmittance in a wavelength range of 500 nm-580 nm of the second optical lens element 220 including the short-wavelength light absorbing agent is T5058, an average transmittance in a wavelength range of 580 nm-700 nm of the second optical lens element 220 including the short-wavelength light absorbing agent is T5870, and an average transmittance in a wavelength range of 400 nm-420 nm of the second optical lens element 220 including the short-wavelength light absorbing agent is T4042, the following conditions can be satisfied: T3540≤40%; T4045<90%; 65%≤T4050; 85%≤T5058; 85%≤T5870; and T4042≤50%.

In the optical image lens assembly of the 2nd embodiment, both of the first optical lens element 210 and the second optical lens element 220 include the least one short-wavelength light absorbing agent, and the compositions of the short-wavelength light absorbing agents of the first optical lens element 210 and the second optical lens element 220 can be the same or different. Moreover, the first optical lens element 210 closest to the object side includes the least one short-wavelength light absorbing agent, and the second optical lens element 220 includes the short-wavelength light absorbing agent.

In the optical image lens assembly of the 2nd embodiment, a maximum thickness of the optical lens element including the short-wavelength light absorbing agent is TKmax and a minimum thickness of the optical lens element including the short-wavelength light absorbing agent is TKmin. In the 2nd embodiment, the first optical lens element 210 includes the short-wavelength light absorbing agent, and the following conditions are satisfied: TKmax=0.53 mm, TKmin=0.47 mm, and TKmax/TKmin=1.12. The second optical lens element 220 includes the short-wavelength light absorbing agent, and the following conditions are satisfied: TKmax=1.37 mm, TKmin=0.76 mm, and TKmax/TKmin=1.18.

In the optical image lens assembly of the 2nd embodiment, a sum of central thicknesses of the optical lens elements including the short-wavelength light absorbing agent is sumCTa (in the 2nd embodiment, both of the first optical lens element 210 and the second optical lens element 220 include the short-wavelength light absorbing agent, that is, sumCTa equals to a central thickness of the first optical lens element 210 plus a central thickness of the 15 second optical lens element 220), a sum of central thicknesses of the optical lens elements is sumCT (in the 2nd embodiment, sumCT equals to a central thickness of the first optical lens element 210 plus a central thickness of the second optical lens element 220), and a maximum of maximum effective diameters of the optical lens elements including the short-wavelength light absorbing agent is φmax (in the 2nd embodiment, φmax equals to a maximum effective diameter of the second optical lens element 220), the following conditions are satisfied: sumCTa=1.72 mm; φmax=3.12 mm; sumCT=1.72 mm; sumCTa/sumCT=1; and φmax/sumCTa=1.81.

The details of the plastic material and the short-wavelength light absorbing agent have been mentioned above, and are not repeated herein.

3rd Embodiment

Figure 3:
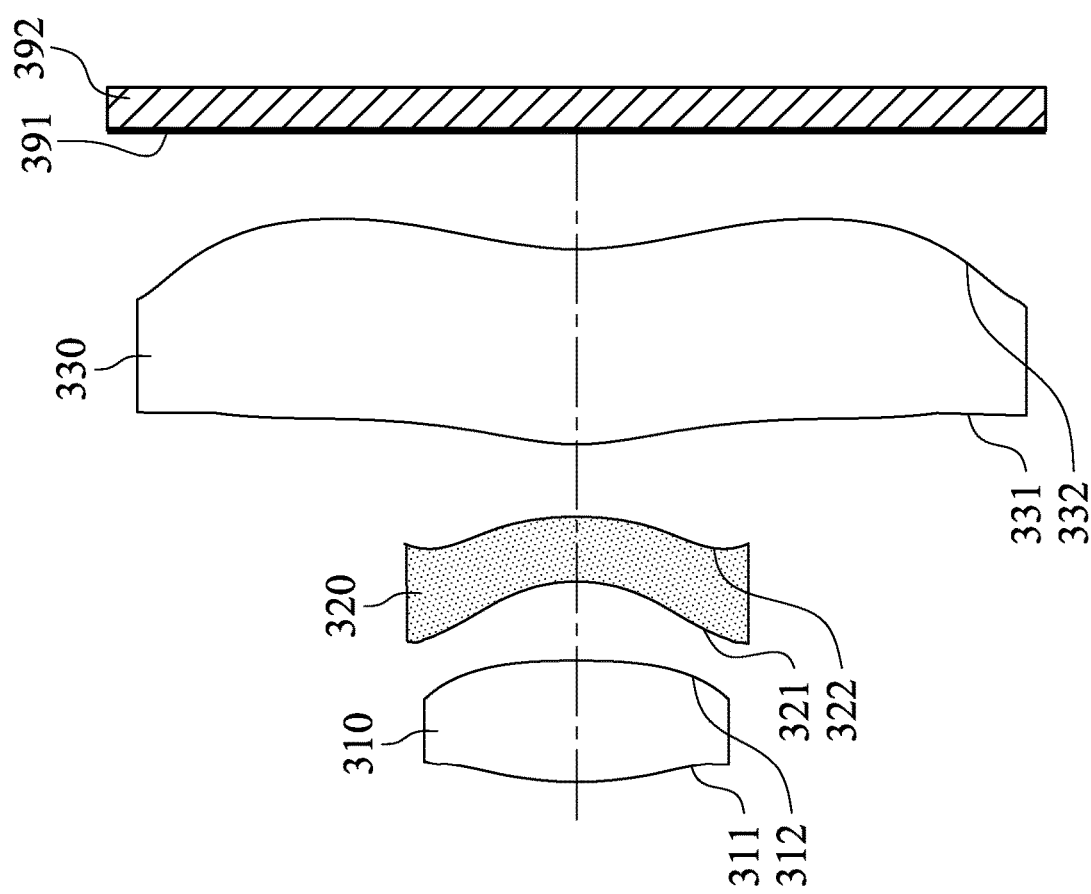
FIG. 3 is a schematic view of an image capturing apparatus according to the 3rd embodiment of the present disclosure.

FIG. 3 is a schematic view of an image capturing apparatus according to the 3rd embodiment of the present disclosure. In FIG. 3, the image capturing apparatus includes an optical image lens assembly (its reference numeral is omitted) and an image sensor 392. The optical image lens assembly includes, in order from an object side to an image side, a first optical lens element 310, a second optical lens element 320, a third optical lens element 330 and an image surface 391, wherein the image sensor 392 is disposed on the image surface 391 of the optical image lens assembly. The optical image lens assembly can selectively include other elements, such as an aperture stop (not shown) or an IR-cut filter (not shown). The other elements are conventional and will not be described herein.

The first optical lens element 310 with positive refractive power has an object-side surface 311 being convex in a paraxial region thereof and an image-side surface 312 being convex in a paraxial region thereof, and has the object-side surface 311 and the image-side surface 312 being both aspheric. The first optical lens element 310 is made of a plastic material (its reference numeral is omitted). When a central thickness of the first optical lens element 310 is CT1, the following condition is satisfied: CT1=0.43 mm.

The second optical lens element 320 with negative refractive power has an object-side surface 321 being concave in a paraxial region thereof and an image-side surface 322 being convex in a paraxial region thereof, and has the object-side surface 321 and the image-side surface 322 being both aspheric. The second optical lens element 320 is made of a plastic material (its reference numeral is omitted), and includes at least one short-wavelength light absorbing agent (its reference numeral is omitted). When a central thickness of the second optical lens element 320 including the short-wavelength light absorbing agent is CT2, the following condition is satisfied: CT2=0.23 mm (that is, CT2 is CTa of the second optical lens element 320). When a maximum wavelength correspondent to a 50% transmittance of the second optical lens element 320 including the short-wavelength light absorbing agent is WLT50, the following condition can be satisfied: WLT50≤435 nm. An average transmittance in a wavelength range of 350 nm-400 nm of the second optical lens element 320 including the short-wavelength light absorbing agent is T3540, an average transmittance in a wavelength range of 400 nm-450 nm of the second optical lens element 320 including the short-wavelength light absorbing agent is T4045, an average transmittance in a wavelength range of 400 nm-500 nm of the optical lens element 320 including the short-wavelength light absorbing agent is T4050, an average transmittance in a wavelength range of 500 nm-580 nm of the second optical lens element 320 including the short-wavelength light absorbing agent is T5058, an average transmittance in a wavelength range of 580 nm-700 nm of the second optical lens element 320 including the short-wavelength light absorbing agent is T5870, and an average transmittance in a wavelength range of 400 nm-420 nm of the second optical lens element 320 including the short-wavelength light absorbing agent is T4042, the following conditions can be satisfied: T3540≤40%; T4045<90%; 65%≤T4050; 85%≤T5058; 85%≤T5870; and T4042≤50%.

The third optical lens element 330 with positive refractive power has an object-side surface 331 being convex in a paraxial region thereof and an image-side surface 332 being concave in a paraxial region thereof, and has the object-side surface 331 and the image-side surface 332 being both aspheric. The third optical lens element 330 is made of a plastic material (its reference numeral is omitted). When a central thickness of the third optical lens element 330 is CT3, the following condition is satisfied: CT3=0.69 mm.

In the optical image lens assembly of the 3rd embodiment, only the second optical lens element 320 among the optical lens elements in order from the object side to the image side include the least one short-wavelength light absorbing agent.

In the optical image lens assembly of the 3rd embodiment, a maximum thickness of the optical lens element including the short-wavelength light absorbing agent is TKmax and a minimum thickness of the optical lens element including the short-wavelength light absorbing agent is TKmin. In the 3rd embodiment, the second optical lens element 320 includes the short-wavelength light absorbing agent, and the following conditions are satisfied: TKmax=0.34 mm, TKmin=0.23 mm, and TKmax/TKmin=1.47.

In the optical image lens assembly of the 3rd embodiment, a sum of central thicknesses of the optical lens elements including the short-wavelength light absorbing agent is sumCTa (in the 3rd embodiment, only the second optical lens element 320 includes the short-wavelength light absorbing agent, that is, sumCTa equals to a central thickness of the second optical lens element 320), a sum of central thicknesses of the optical lens elements is sumCT (in the 3rd embodiment, sumCT equals to a central thickness of the first optical lens element 310 plus a central thickness of the second optical lens element 320 plus a central thickness of the third optical lens element 330), and a maximum of maximum effective diameters of the optical lens elements including the short-wavelength light absorbing agent is φmax (in the 3rd embodiment, φmax equals to a maximum effective diameter of the second optical lens element 320), the following conditions are satisfied: sumCTa=0.23 mm; φmax=1.21 mm; sumCT=1.35 mm; sumCTa/sumCT=0.17; and φmax/CTall=5.28.

The details of the plastic material and the short-wavelength light absorbing agent have been mentioned above, and are not repeated herein.

4th Embodiment

Figure 4:
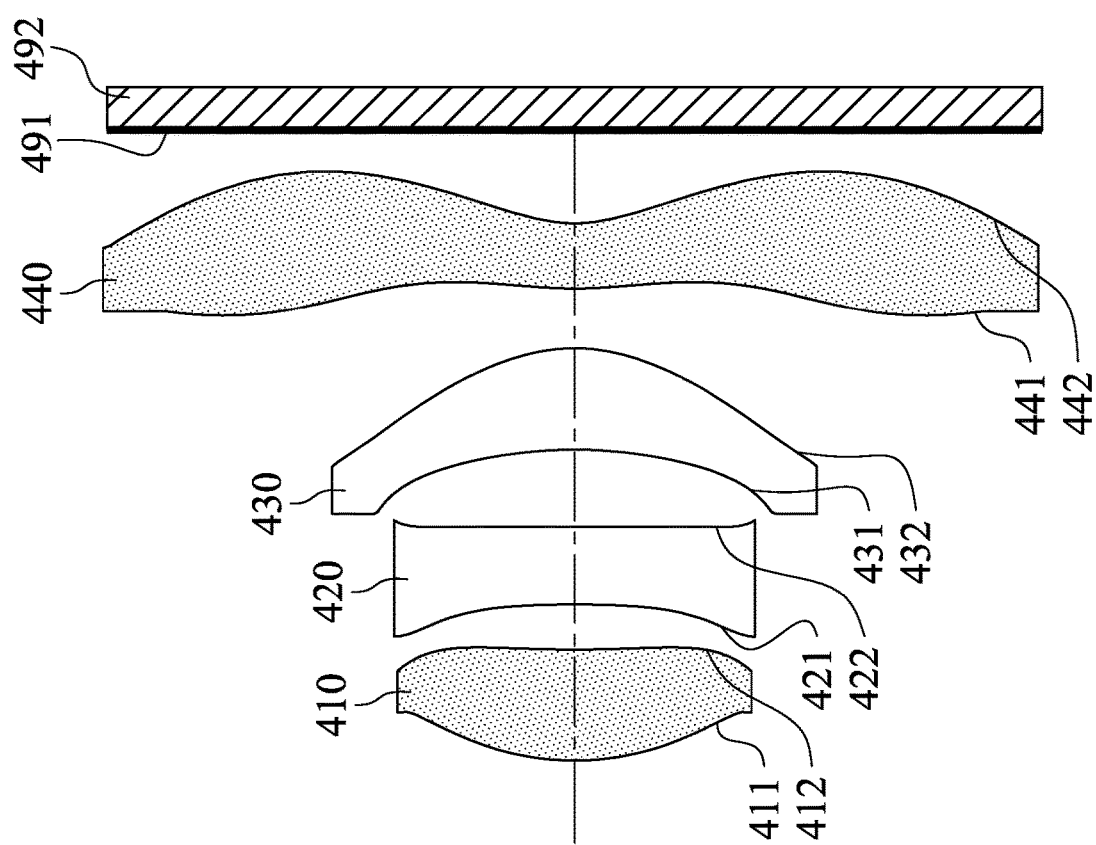
FIG. 4 is a schematic view of an image capturing apparatus according to the 4th embodiment of the present disclosure.

FIG. 4 is a schematic view of an image capturing apparatus according to the 4th embodiment of the present disclosure. In FIG. 4, the image capturing apparatus includes an optical image lens assembly (its reference numeral is omitted) and an image sensor 492. The optical image lens assembly includes, in order from an object side to an image side, a first optical lens element 410, a second optical lens element 420, a third optical lens element 430, a fourth optical lens element 440 and an image surface 491, wherein the image sensor 492 is disposed on the image surface 491 of the optical image lens assembly. The optical image lens assembly can selectively include other elements, such as an aperture stop (not shown) or an IR-cut filter (not shown). The other elements are conventional and will not be described herein.

The first optical lens element 410 with positive refractive power has an object-side surface 411 being convex in a paraxial region thereof and an image-side surface 412 being concave in a paraxial region thereof, and has the object-side surface 411 and the image-side surface 412 being both aspheric. The first optical lens element 410 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the first optical lens element 410 including the short-wavelength light absorbing agent is CT1, the following condition is satisfied: CT1=0.54 mm (that is, CT1 is CTa of the first optical lens element 410). When a maximum wavelength correspondent to a 50% transmittance of the first optical lens element 410 including the short-wavelength light absorbing agent is WLT50, the following condition can be satisfied: WLT50≤435 nm. When an average transmittance in a wavelength range of 350 nm-400 nm of the first optical lens element 410 including the short-wavelength light absorbing agent is T3540, an average transmittance in a wavelength range of 400 nm-450 nm of the first optical lens element 410 including the short-wavelength light absorbing agent is T4045, an average transmittance in a wavelength range of 400 nm-500 nm of the first optical lens element 410 including the short-wavelength light absorbing agent is T4050, an average transmittance in a wavelength range of 500 nm-580 nm of the first optical lens element 410 including the short-wavelength light absorbing agent is T5058, and an average transmittance in a wavelength range of 580 nm-700 nm of the first optical lens element 410 including the short-wavelength light absorbing agent is T5870, the following conditions can be satisfied: T3540≤40%; T4045<90%; 65%≤T4050; 85%≤T5058; and 85%≤T5870.

The second optical lens element 420 with negative refractive power has an object-side surface 421 being concave in a paraxial region thereof and an image-side surface 422 being concave in a paraxial region thereof, and has the object-side surface 421 and the image-side surface 422 being both aspheric. The second optical lens element 420 is made of a plastic material (its reference numeral is omitted). When a central thickness of the second optical lens element 420 is CT2, the following condition is satisfied: CT2=0.38 mm.

The third optical lens element 430 with positive refractive power has an object-side surface 431 being concave in a paraxial region thereof and an image-side surface 432 being convex in a paraxial region thereof, and has the object-side surface 431 and the image-side surface 432 being both aspheric. The third optical lens element 430 is made of a plastic material (its reference to numeral is omitted). When a central thickness of the third optical lens element 430 is CT3, the following condition is satisfied: CT3=0.49 mm.

The fourth optical lens element 440 with negative refractive power has an object-side surface 441 being convex in a paraxial region thereof and an image-side surface 442 being concave in a paraxial region thereof, and has the object-side surface 441 and the image-side surface 442 being both aspheric. The fourth optical lens element 440 is made of a plastic material (Its reference numeral is omitted), and includes at least one short-wavelength light absorbing agent (its reference numeral is omitted). The short-wavelength light absorbing agent is homogeneously mixed with the plastic material. When a central thickness of the fourth optical lens element 440 including the short-wavelength light absorbing agent is CT4, the following condition is satisfied: CT4=0.32 mm (that is, CT4 is CTa of the fourth optical lens element 440). When a maximum wavelength correspondent to a 50% transmittance of the fourth optical lens element 440 including the short-wavelength light absorbing agent is WLT50, the following condition can be satisfied: WLT50≤435 nm. When an average transmittance in a wavelength range of 350 nm-400 nm of the fourth optical lens element 440 including the short-wavelength light absorbing agent is T3540, an average transmittance in a wavelength range of 400 nm-450 nm of the fourth optical lens element 440 including the short-wavelength light absorbing agent is T4045, an average transmittance in a wavelength range of 400 nm-500 nm of the fourth optical lens element 440 including the short-wavelength light absorbing agent is T4050, an average transmittance in a wavelength range of 500 nm-580 nm of the fourth optical lens element 440 including the short-wavelength light absorbing agent is T5058, and an average transmittance in a wavelength range of 580 nm-700 nm of the fourth optical lens element 440 including the short-wavelength light absorbing agent is T5870, the following conditions can be satisfied: T3540≤40%; T4045<90%; 65%≤T4050; 85%≤T5058; and 85%≤T5870.

In the optical image lens assembly of the 4th embodiment, both of the first optical lens element 410 and the fourth optical lens element 440 include the least one short-wavelength light absorbing agent, and the compositions of the short-wavelength light absorbing agents of the first optical lens element 410 and the fourth optical lens element 440 can be the same or different. Moreover, the first optical lens element 410 closest to the object side includes the least one short-wavelength light absorbing agent.

In the optical image lens assembly of the 4th embodiment, a maximum thickness of the optical lens element including the short-wavelength light absorbing agent is TKmax and a minimum thickness of the optical lens element including the short-wavelength light absorbing agent is TKmin. In the 4th embodiment, the first optical lens element 410 includes the short-wavelength light absorbing agent, and the following conditions are satisfied: TKmax=0.54 mm, TKmin=0.20 mm, and TKmax/TKmin=2.72. The fourth optical lens element 440 includes the short-wavelength light absorbing agent, and the following conditions are satisfied: TKmax=0.66 mm, TKmin=0.32 mm, and TKmax/TKmin=2.09.

In the optical image lens assembly of the 4th embodiment, a sum of central thicknesses of the optical lens elements including the short-wavelength light absorbing agent is sumCTa (in the 4th embodiment, both of the first optical lens element 410 and the fourth optical lens element 440 include the short-wavelength light absorbing agent, that is, sumCTa equals to a central thickness of the first optical lens element 410 plus a central thickness of the fourth optical lens element 440), a sum of central thicknesses of the optical lens elements is sumCT (in the 4th embodiment, sumCT equals to a central thickness of the first optical lens element 410 plus a central thickness of the second optical lens element 420 plus a central thickness of the third optical lens element 430 plus a central thickness of the fourth optical lens element 440), and a maximum of maximum effective diameters of the optical lens elements including the short-wavelength light absorbing agent is φmax (in the 4th embodiment, φmax equals to a maximum effective diameter of the fourth optical lens element 440), the following conditions are satisfied: sumCTa=0.86 mm; sumCT=1.73 mm; sumCTa/sumCT=0.50; φmax=4.55 mm; and φmax/sumCTa=5.30.

The details of the plastic material and the short-wavelength light absorbing agent have been mentioned above, and are not repeated herein.

5th Embodiment

Figure 5:
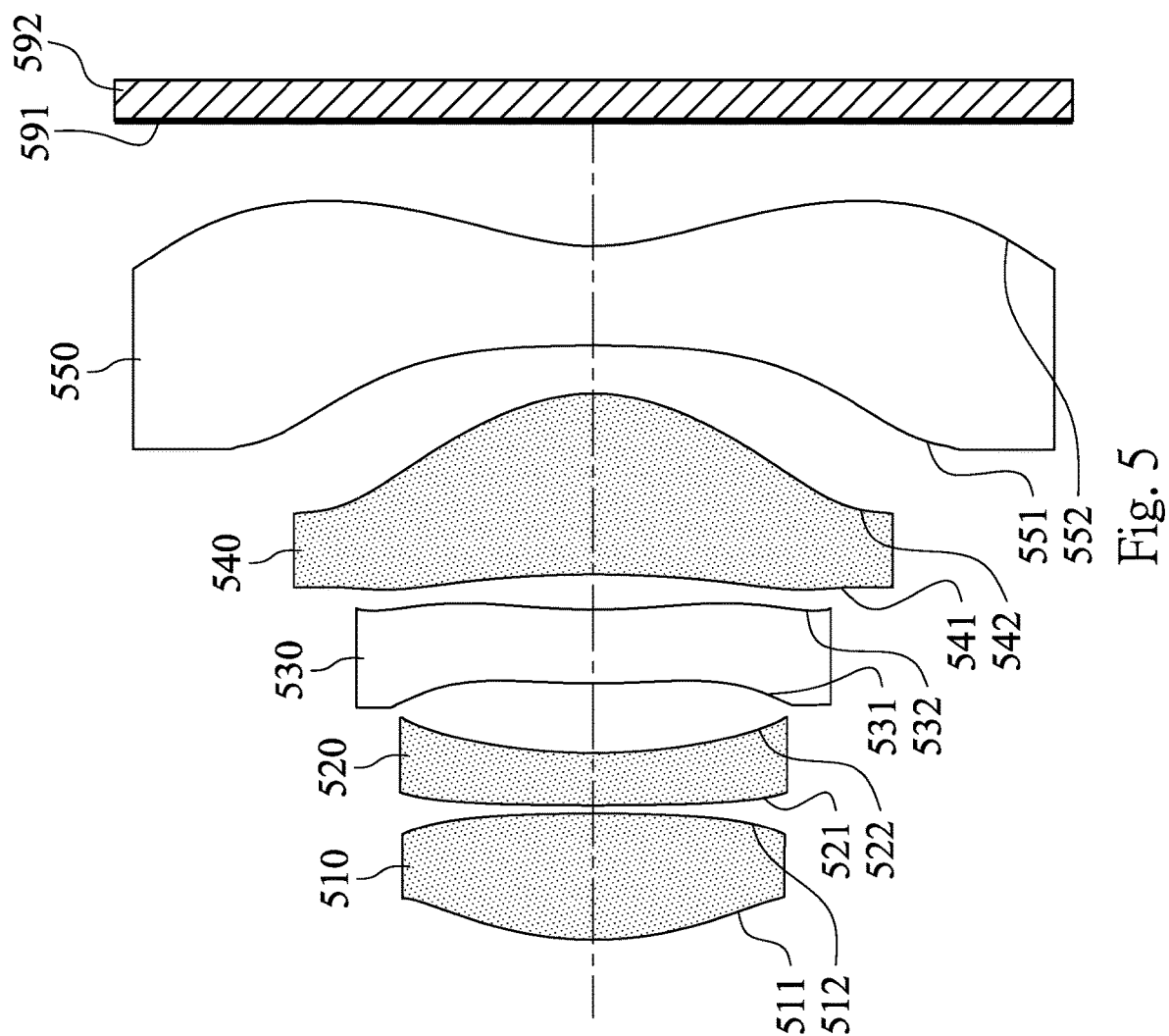
FIG. 5 is a schematic view of an image capturing apparatus according to the 5th embodiment of the present disclosure.

FIG. 5 is a schematic view of an image capturing apparatus according to the 5th embodiment of the present disclosure. In FIG. 5, the image capturing apparatus includes an optical image lens assembly (its reference numeral is omitted) and an image sensor 592. The optical image lens assembly includes, in order from an object side to an image side, a first optical lens element 510, a second optical lens element 520, a third optical lens element 530, a fourth optical lens element 540, a fifth optical lens element 550 and an image surface 591, wherein the image sensor 592 is disposed on the image surface 591 of the optical image lens assembly. The optical image lens assembly can selectively include other elements, such as an aperture stop (not shown) or an IR-cut filter (not shown). The other elements are conventional and will not be described herein.

The first optical lens element 510 with positive refractive power has an object-side surface 511 being convex in a paraxial region thereof and an image-side surface 512 being convex in a paraxial region thereof, and has the object-side surface 511 and the image-side surface 512 being both aspheric. The first optical lens element 510 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the first optical lens element 510 including the short-wavelength light absorbing agent is CT1, the following condition is satisfied: CT1=0.65 mm (that is, CT1 is CTa of the first optical lens element 510). When a maximum wavelength correspondent to a 50% transmittance of the first optical lens element 510 including the short-wavelength light absorbing agent is WLT50, the following condition can be satisfied: WLT50≤435 nm. When an average transmittance in a wavelength range of 350 nm-400 nm of the first optical lens element 510 including the short-wavelength light absorbing agent is T3540, an average transmittance in a wavelength range of 400 nm-450 nm of the first optical lens element 510 including the short-wavelength light absorbing agent is T4045, an average transmittance in a wavelength range of 400 nm-500 nm of the first optical lens element 510 including the short-wavelength light absorbing agent is T4050, an average transmittance in a wavelength range of 500 nm-580 nm of the first optical lens element 510 including the short-wavelength light absorbing agent is T5058, and an average transmittance in a wavelength range of 580 nm-700 nm of the first optical lens element 510 including the short-wavelength light absorbing agent is T5870, the following conditions can be satisfied: T3540≤40%; T4045<90%; 65%≤T4050; 85%≤T5058; and 85%≤T5870.

The second optical lens element 520 with negative refractive power has an object-side surface 521 being convex in a paraxial region thereof and an image-side surface 522 being concave in a paraxial region thereof, and has the object-side surface 521 and the image-side surface 522 being both aspheric. The second optical lens element 520 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the second optical lens element 520 including the short-wavelength light absorbing agent is CT2, the following condition is satisfied: CT2=0.27 mm (that is, CT2 is CTa of the second optical lens element 520). When a maximum wavelength correspondent to a 50% transmittance of the second optical lens element 520 including the short-wavelength light absorbing agent is WLT50, the following condition can be satisfied: WLT50≤435 nm. When an average transmittance in a wavelength range of 350 nm-400 nm of the second optical lens element 520 including the short-wavelength light absorbing agent is T3540, an average transmittance in a wavelength range of 400 nm-450 nm of the second optical lens element 520 including the short-wavelength light absorbing agent is T4045, an average transmittance in a wavelength range of 400 nm-500 nm of the second optical lens element 520 including the short-wavelength light absorbing agent is T4050, an average transmittance in a wavelength range of 500 nm-580 nm of the second optical lens element 520 including the short-wavelength light absorbing agent is T5058, and an average transmittance in a wavelength range of 580 nm-700 nm of the second optical lens element 520 including the short-wavelength light absorbing agent is T5870, the following conditions can be satisfied: T3540≤40%; T4045<90%; 65%≤T4050; 85%≤T5058; and 85%≤T5870.

The third optical lens element 530 with negative refractive power has an object-side surface 531 being convex in a paraxial region thereof and an image-side surface 532 being concave in a paraxial region thereof, and has the object-side surface 531 and the image-side surface 532 being both aspheric. The third optical lens element 530 is made of a plastic material (its reference numeral is omitted). When a central thickness of the third optical lens element 530 is CT3, the following condition is satisfied: CT3=0.38 mm.

The fourth optical lens element 540 with positive refractive power has an object-side surface 541 being concave in a paraxial region thereof and an image-side surface 542 being convex in a paraxial region thereof, and has the object-side surface 541 and the image-side surface 542 being both aspheric. The fourth optical lens element 540 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the fourth optical lens element 540 including the short-wavelength light absorbing agent is CT4, the following condition is satisfied: CT4=0.93 mm (that is, CT4 is CTa of the fourth optical lens element 540). When a maximum wavelength correspondent to a 50% transmittance of the fourth optical lens element 540 including the short-wavelength light absorbing agent is WLT50, the following condition can be satisfied: WLT50≤435 nm. When an average transmittance in a wavelength range of 350 nm-400 nm of the fourth optical lens element 540 including the short-wavelength light absorbing agent is T3540, an average transmittance in a wavelength range of 400 nm-450 nm of the fourth optical lens element 540 including the short-wavelength light absorbing agent is T4045, an average transmittance in a wavelength range of 400 nm-500 nm of the fourth optical lens element 540 including the short-wavelength light absorbing agent is T4050, an average transmittance in a wavelength range of 500 nm-580 nm of the fourth optical lens element 540 including the short-wavelength light absorbing agent is T5058, and an average transmittance in a wavelength range of 580 nm-700 nm of the fourth optical lens element 540 including the short-wavelength light absorbing agent is T5870, the following conditions can be satisfied: T3540≤40%; T4045<90%; 65%≤T4050; 85%≤T5058; and 85%≤T5870.

The fifth optical lens element 550 with negative refractive power has an object-side surface 551 being concave in a paraxial region thereof and an image-side surface 552 being concave in a paraxial region thereof, and has the object-side surface 551 and the image-side surface 552 being both aspheric. The fifth optical lens element 550 is made of a plastic material (Its reference numeral is omitted). When a central thickness of the fifth optical lens element 550 is CT1, the following condition is satisfied: CT5=0.51 mm.

In the optical image lens assembly of the 5th embodiment, all of the first optical lens element 510, the second optical lens element 520 and the fourth optical lens element 540 include the least one short-wavelength light absorbing agent, and the compositions of the short-wavelength light absorbing agents of the first optical lens element 510, the second optical lens element 520 and the fourth optical lens element 540 can be the same or different. Moreover, the first optical lens element 510 closest to the object side includes the least one short-wavelength light absorbing agent, and the second optical lens element 520 among the optical lens elements in order from the object side to the image side includes the least one short-wavelength light absorbing agent.

In the optical image lens assembly of the 5th embodiment, a maximum thickness of the optical lens element including the short-wavelength light absorbing agent is TKmax and a minimum thickness of the optical lens element including the short-wavelength light absorbing agent is TKmin. In the 5th embodiment, the first optical lens element 510 includes the short-wavelength light absorbing agent, and the following conditions are satisfied: TKmax=0.65 mm, TKmin=0.33 mm, and TKmax/TKmin=1.98. The second optical lens element 520 includes the short-wavelength light absorbing agent, and the following conditions are satisfied: TKmax=0.98 mm, TKmin=0.27 mm, and TKmax/TKmin=3.67. The fourth optical lens element 540 includes the short-wavelength light absorbing agent, and the following conditions are satisfied: TKmax=0.93 mm, TKmin=0.38 mm, and TKmax/TKmin=2.44.

In the optical image lens assembly of the 5th embodiment, a sum of central thicknesses of the optical lens elements including the short-wavelength light absorbing agent is sumCTa (in the 5th embodiment, the first optical lens element 510, the second optical lens element 520 and the fourth optical lens element 540 include the short-wavelength light absorbing agent, that is, sumCTa equals to a central thickness of the first optical lens element 510 plus a central thickness of the second optical lens element 520 plus a central thickness of the fourth optical lens element 540), a sum of central thicknesses of the optical lens elements is sumCT (in the 5th embodiment, sumCT equals to a central thickness of the first optical lens element 510 plus a central thickness of the second optical lens element 520 plus a central thickness of the third optical lens element 530 plus a central thickness of the fourth optical lens element 540 plus and a central thickness of the fifth optical lens element 550), and a maximum of maximum effective diameters of the optical lens elements including the short-wavelength light absorbing agent is φmax (in the 5th embodiment, φmax equals to a maximum effective diameter of the fourth optical lens element 540), the following conditions are satisfied: sumCTa=1.84 mm; φmax=3.04 mm; sumCT=2.73 mm; sumCTa/sumCT=0.67; and φmax/sumCTa=1.65.

The details of the plastic material and the short-wavelength light absorbing agent have been mentioned above, and are not repeated herein.

6th Embodiment

Figure 6:
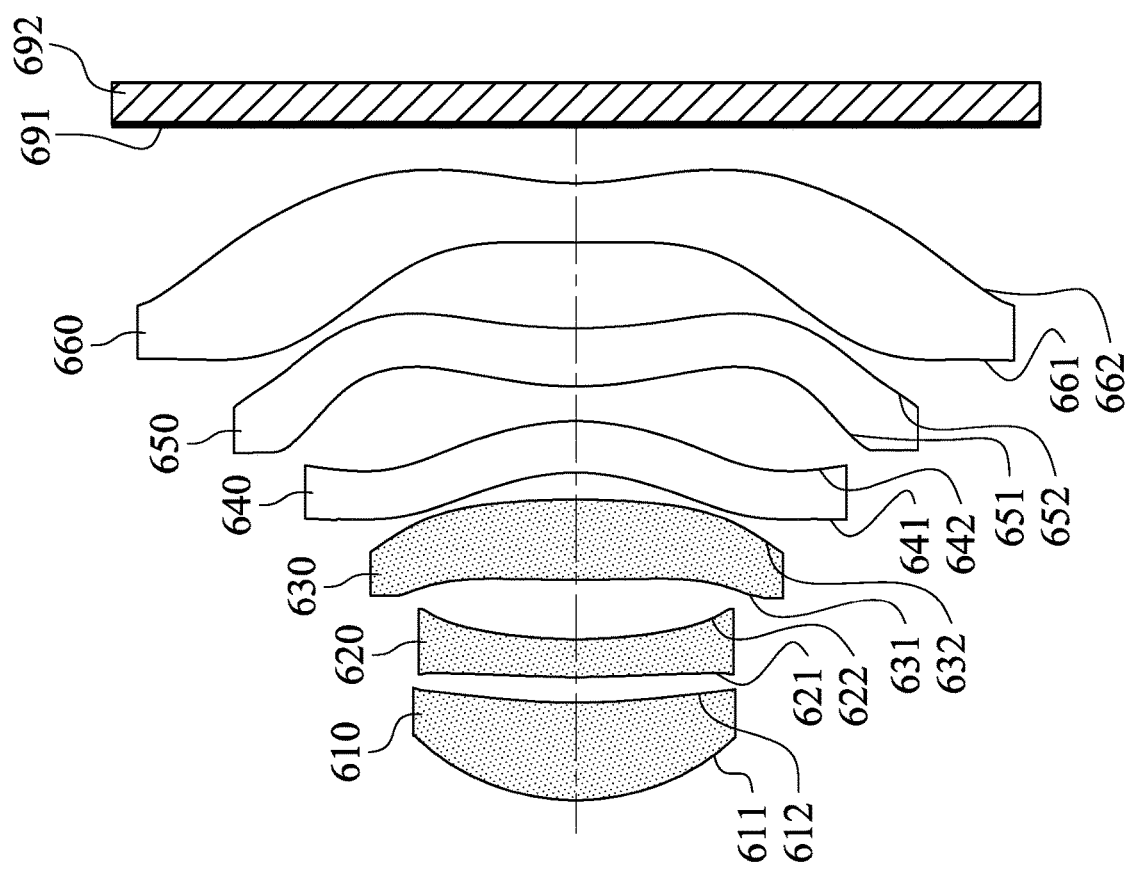
FIG. 6 is a schematic view of an image capturing apparatus according to the 6th embodiment of the present disclosure.

FIG. 6 is a schematic view of an image capturing apparatus according to the 6th embodiment of the present disclosure. In FIG. 6, the image capturing apparatus includes an optical image lens assembly (its reference numeral is omitted) and an image sensor 692. The optical image lens assembly includes, in order from an object side to an image side, a first optical lens element 610, a second optical lens element 620, a third optical lens element 630, a fourth optical lens element 640, a fifth optical lens element 650, a sixth optical lens element 660 and an image surface 691, wherein the image sensor 692 is disposed on the image surface 691 of the optical image lens assembly. The optical image lens assembly can selectively include other elements, such as an aperture stop (not shown) or an IR-cut filter (not shown). The other elements are conventional and will not be described herein.

The first optical lens element 610 with positive refractive power has an object-side surface 611 being convex in a paraxial region thereof and an image-side surface 612 being concave in a paraxial region thereof, and has the object-side surface 611 and the image-side surface 612 being both aspheric. The first optical lens element 610 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the first optical lens element 610 including the short-wavelength light absorbing agent is CT1, the following condition is satisfied: CT1=0.57 mm (that is, CT1 is CTa of the first optical lens element 610). When a maximum wavelength correspondent to a 50% transmittance of the first optical lens element 610 including the short-wavelength light absorbing agent is WLT50, the following condition can be satisfied: WLT50≤435 nm. When an average transmittance in a wavelength range of 350 nm-400 nm of the first optical lens element 610 including the short-wavelength light absorbing agent is T3540, an average transmittance in a wavelength range of 400 nm-450 nm of the first optical lens element 610 including the short-wavelength light absorbing agent is T4045, an average transmittance in a wavelength range of 400 nm-500 nm of the first optical lens element 610 including the short-wavelength light absorbing agent is T4050, an average transmittance in a wavelength range of 500 nm-580 nm of the first optical lens element 610 including the short-wavelength light absorbing agent is T5058, an average transmittance in a wavelength range of 580 nm-700 nm of the first optical lens element 610 including the short-wavelength light absorbing agent is T5870, and an average transmittance in a wavelength range of 400 nm-420 nm of the first optical lens element 610 including the short-wavelength light absorbing agent is T4042, the following conditions can be satisfied: T3540≤40%; T4045<90%; 65%≤T4050; 85%≤T5058; 85%≤T5870; and T4042≤50%.

The second optical lens element 620 with negative refractive power has an object-side surface 621 being convex in a paraxial region thereof and an image-side surface 622 being concave in a paraxial region thereof, and has the object-side surface 621 and the image-side surface 622 being both aspheric. The second optical lens element 620 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the second optical lens element 620 including the short-wavelength light absorbing agent is CT2, the following condition is satisfied: CT2=0.22 mm (that is, CT2 is CTa of the second optical lens element 620). When a maximum wavelength correspondent to a 50% transmittance of the second optical lens element 620 including the short-wavelength light absorbing agent is WLT50, the following condition can be satisfied: WLT50≤435 nm. When an average transmittance in a wavelength range of 350 nm-400 nm of the second optical lens element 620 including the short-wavelength light absorbing agent is T3540, an average transmittance in a wavelength range of 400 nm-450 nm of the second optical lens element 620 including the short-wavelength light absorbing agent is T4045, an average transmittance in a wavelength range of 400 nm-500 nm of the second optical lens element 620 including the short-wavelength light absorbing agent is T4050, an average transmittance in a wavelength range of 500 nm-580 nm of the second optical lens element 620 including the short-wavelength light absorbing agent is T5058, an average transmittance in a wavelength range of 580 nm-700 nm of the second optical lens element 620 including the short-wavelength light absorbing agent is T5870, and an average transmittance in a wavelength range of 400 nm-420 nm of the second optical lens element 620 including the short-wavelength light absorbing agent is T4042, the following conditions can be satisfied: T3540≤40%; T4045<90%; 65%≤T4050; 85%≤T5058; 85%≤T5870; and T4042≤50%.

The third optical lens element 630 with positive refractive power has an object-side surface 631 being convex in a paraxial region thereof and an image-side surface 632 being convex in a paraxial region thereof, and has the object-side surface 631 and the image-side surface 632 being both aspheric. The third optical lens element 630 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the third optical lens element 630 including the short-wavelength light absorbing agent is CT3, the following condition is satisfied: CT3=0.47 mm (that is, CT3 is CTa of the third optical lens element 630). When a maximum wavelength correspondent to a 50% transmittance of the third optical lens element 630 including the short-wavelength light absorbing agent is WLT50, the following condition can be satisfied: WLT50≤435 nm. When an average transmittance in a wavelength range of 350 nm-400 nm of the third optical lens element 630 including the short-wavelength light absorbing agent is T3540, an average transmittance in a wavelength range of 400 nm-450 nm of the third optical lens element 630 including the short-wavelength light absorbing agent is T4045, an average transmittance in a wavelength range of 400 nm-500 nm of the third optical lens element 630 including the short-wavelength light absorbing agent is T4050, an average transmittance in a wavelength range of 500 nm-580 nm of the third optical lens element 630 including the short-wavelength light absorbing agent is T5058, an average transmittance in a wavelength range of 580 nm-700 nm of the third optical lens element 630 including the short-wavelength light absorbing agent is T5870, and an average transmittance in a wavelength range of 400 nm-420 nm of the third optical lens element 630 including the short-wavelength light absorbing agent is T4042, the following conditions can be satisfied: T3540≤40%; T4045<90%; 65%≤T4050; 85%≤T5058; 85%≤T5870; and T4042≤50%.

The fourth optical lens element 640 with negative refractive power has an object-side surface 641 being concave in a paraxial region thereof and an image-side surface 642 being convex in a paraxial region thereof, and has the object-side surface 641 and the image-side surface 642 being both aspheric. The fourth optical lens element 640 is made of a plastic material (its reference numeral is omitted). When a central thickness of the fourth optical lens element 640 is CT4, the following condition is satisfied: CT4=0.30 mm.

The fifth optical lens element 650 with positive refractive power has an object-side surface 651 being convex in a paraxial region thereof and an image-side surface 652 being concave in a paraxial region thereof, and has the object-side surface 651 and the image-side surface 652 being both aspheric. The fifth optical lens element 650 is made of a plastic material (its reference numeral is omitted). When a central thickness of the fifth optical lens element 650 is CT5, the following condition is satisfied: CT5=0.34 mm.

The sixth optical lens element 660 with negative refractive power has an object-side surface 661 being concave in a paraxial region thereof and an image-side surface 662 being concave in a paraxial region thereof, and has the object-side surface 661 and the image-side surface 662 being both aspheric. The sixth optical lens element 660 is made of a plastic material (its reference numeral is omitted).

When a central thickness of the sixth optical lens element 660 is CT6, the following condition is satisfied: CT6=0.35 mm.

In the optical image lens assembly of the 6th embodiment, all of the first optical lens element 610, the second optical lens element 620 and the third optical lens element 630 include the least one short-wavelength light absorbing agent, and the compositions of the short-wavelength light absorbing agents of the first optical lens element 610, the second optical lens element 620 and the third optical lens element 630 can be the same or different. Moreover, the first optical lens element 610 closest to the object side includes the least one short-wavelength light absorbing agent, and the second optical lens element 620 and the third optical lens element 630 among the optical lens elements in order from the object side to the image side include the least one short-wavelength light absorbing agent.

In the optical image lens assembly of the 6th embodiment, a maximum thickness of the optical lens element including the short-wavelength light absorbing agent is TKmax and a minimum thickness of the optical lens element including the short-wavelength light absorbing agent is TKmin. In the 6th embodiment, the first optical lens element 610 includes the short-wavelength light absorbing agent, and the following conditions are satisfied: TKmax=0.57 mm, TKmin=0.28 mm, and TKmax/TKmin=2.05. The second optical lens element 620 includes the short-wavelength light absorbing agent, and the following conditions are satisfied: TKmax=0.38 mm, TKmin=0.22 mm, and TKmax/TKmin=1.73. The third optical lens element 630 includes the short-wavelength light absorbing agent, and the following conditions are satisfied: TKmax=0.47 mm, TKmin=0.25 mm, and TKmax/TKmin=1.85.

In the optical image lens assembly of the 6th embodiment, a sum of central thicknesses of the optical lens elements including the short-wavelength light absorbing agent is sumCTa (in the 6th embodiment, the first optical lens element 610, the second optical lens element 620 and the third optical lens element 630 include the short-wavelength light absorbing agent, that is, sumCTa equals to a central thickness of the first optical lens element 610 plus a central thickness of the second optical lens element 620 plus a central thickness of the third optical lens element 630), a sum of central thicknesses of the optical lens elements is sumCT (in the 6th embodiment, sumCT equals to a central thickness of the first optical lens element 610 plus a central thickness of the second optical lens element 620 plus a central thickness of the third optical lens element 630 plus a central thickness of the fourth optical lens element 640 plus a central thickness of the fifth optical lens element 650 plus and a central thickness of the sixth optical lens element 660), and a maximum of maximum effective diameters of the optical lens elements including the short-wavelength light absorbing agent is φmax (in the 6th embodiment, φmax equals to a maximum effective diameter of the third optical lens element 630), the following conditions are satisfied: sumCTa=1.26 mm; φmax=2.41 mm; sumCT=2.25 mm; sumCTa/sumCT=0.56; and φmax/sumCTa=1.91.

The details of the plastic material and the short-wavelength light absorbing agent have been mentioned above, and are not repeated herein.

7th Embodiment

Figure 7:
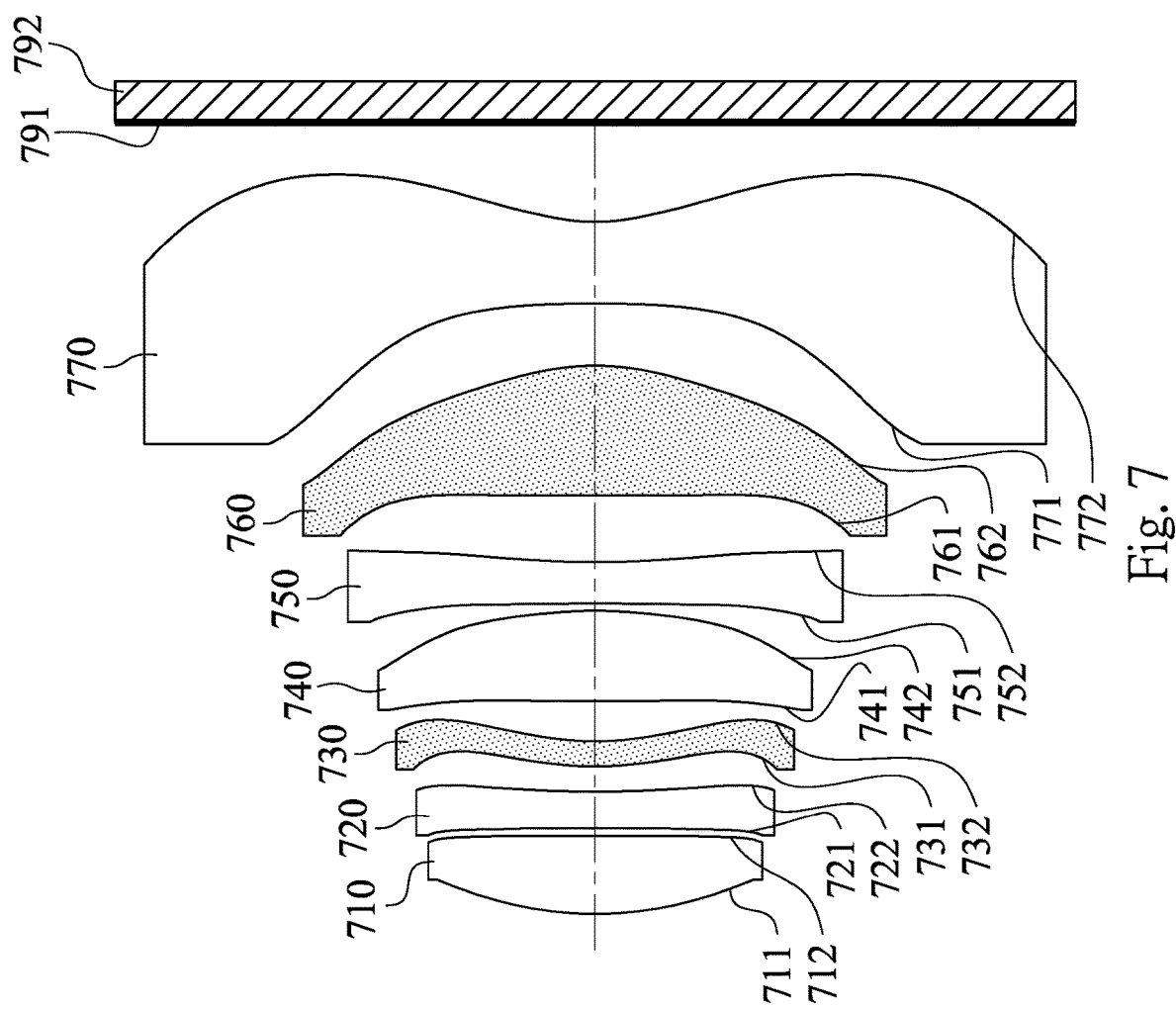
FIG. 7 is a schematic view of an image capturing apparatus according to the 7th embodiment of the present disclosure.

FIG. 7 is a schematic view of an image capturing apparatus according to the 7th embodiment of the present disclosure. In FIG. 7, the image capturing apparatus includes an optical image lens assembly (its reference numeral is omitted) and an image sensor 792. The optical image lens assembly includes, in order from an object side to an image side, a first optical lens element 710, a second optical lens element 720, a third optical lens element 730, a fourth optical lens element 740, a fifth optical lens element 750, a sixth optical lens element 760, a seventh optical lens element 770 and an image surface 791, wherein the image sensor 792 is disposed on the image surface 791 of the optical image lens assembly. The optical image lens assembly can selectively include other elements, such as an aperture stop (not shown) or an IR-cut filter (not shown). The other elements are conventional and will not be described herein.

The first optical lens element 710 with positive refractive power has an object-side surface 711 being convex in a paraxial region thereof and an image-side surface 712 being concave in a paraxial region thereof, and has the object-side surface 711 and the image-side surface 712 being both aspheric. The first optical lens element 710 is made of a plastic material (its reference numeral is omitted). When a central thickness of the first optical lens element 710 is CT1, the following condition is satisfied: CT1=0.57 mm.

The second optical lens element 720 with negative refractive power has an object-side surface 721 being concave in a paraxial region thereof and an image-side surface 722 being concave in a paraxial region thereof, and has the object-side surface 721 and the image-side surface 722 being both aspheric. The second optical lens element 720 is made of a plastic material (its reference numeral is omitted). When a central thickness of the second optical lens element 720 is CT2, the following condition is satisfied: CT2=0.20 mm.

The third optical lens element 730 with negative refractive power has an object-side surface 731 being convex in a paraxial region thereof and an image-side surface 732 being concave in a paraxial region thereof, and has the object-side surface 731 and the image-side surface 732 being both aspheric. The third optical lens element 730 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the third optical lens element 730 including the short-wavelength light absorbing agent is CT3, the following condition is satisfied: CT3=0.19 mm (that is, CT3 is CTa of the third optical lens element 730). When a maximum wavelength correspondent to a 50% transmittance of the third optical lens element 730 including the short-wavelength light absorbing agent is WLT50, the following condition can be satisfied: WLT50≤435 nm. When an average transmittance in a wavelength range of 350 nm-400 nm of the third optical lens element 730 including the short-wavelength light absorbing agent is T3540, an average transmittance in a wavelength range of 400 nm-450 nm of the third optical lens element 730 including the short-wavelength light absorbing agent is T4045, an average transmittance in a wavelength range of 400 nm-500 nm of the third optical lens element 730 including the short-wavelength light absorbing agent is T4050, an average transmittance in a wavelength range of 500 nm-580 nm of the third optical lens element 730 including the short-wavelength light absorbing agent is T5058, and an average transmittance in a wavelength range of 580 nm-700 nm of the third optical lens element 730 including the short-wavelength light absorbing agent is T5870, the following conditions can be satisfied: T3540≤40%; T4045<90%; 65%≤T4050; 85%≤T5058; and 85%≤T5870.

The fourth optical lens element 740 with positive refractive power has an object-side surface 741 being convex in a paraxial region thereof and an image-side surface 742 being convex in a paraxial region thereof, and has the object-side surface 741 and the image-side surface 742 being both aspheric. The fourth optical lens element 740 is made of a plastic material (its reference numeral is omitted). When a central thickness of the fourth optical lens element 740 is CT4, the following condition is satisfied: CT4=0.66 mm.

The fifth optical lens element 750 with negative refractive power has an object-side surface 751 being convex in a paraxial region thereof and an image-side surface 752 being concave in a paraxial region thereof, and has the object-side surface 751 and the image-side surface 752 being both aspheric. The fifth optical lens element 750 is made of a plastic material (its reference numeral is omitted). When a central thickness of the fifth optical lens element 750 is CT5 the following condition is satisfied: CT5=0.30 mm.

The sixth optical lens element 760 with positive refractive power has an object-side surface 761 being convex in a paraxial region thereof and an image-side surface 762 being convex in a paraxial region thereof, and has the object-side surface 761 and the image-side surface 762 being both aspheric. The sixth optical lens element 760 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the sixth optical lens element 760 including the short-wavelength light absorbing agent is CT6, the following condition is satisfied: CT6=0.95 mm (that is, CT6 is CTa of the sixth optical lens element 760). When a maximum wavelength correspondent to a 50% transmittance of the sixth optical lens element 760 including the short-wavelength light absorbing agent is WLT50, the following condition can be satisfied: WLT50≤435 nm. When an average transmittance in a wavelength range of 350 nm-400 nm of the sixth optical lens element 760 including the short-wavelength light absorbing agent is T3540, an average transmittance in a wavelength range of 400 nm-450 nm of the sixth optical lens element 760 including the short-wavelength light absorbing agent is T4045, an average transmittance in a wavelength range of 400 nm-500 nm of the sixth optical lens element 760 including the short-wavelength light absorbing agent is T4050, an average transmittance in a wavelength range of 500 nm-580 nm of the sixth optical lens element 760 including the short-wavelength light absorbing agent is T5058, and an average transmittance in a wavelength range of 580 nm-700 nm of the sixth optical lens element 760 including the short-wavelength light absorbing agent is T5870, the following conditions can be satisfied: T3540≤40%; T4045<90%; 60%≤T4050; 80%≤T5058; and 80%≤T5870.

The seventh optical lens element 770 with negative refractive power has an object-side surface 771 being concave in a paraxial region thereof and an image-side surface 772 being concave in a paraxial region thereof, and has the object-side surface 771 and the image-side surface 772 being both aspheric. The seventh optical lens element 770 is made of a plastic material (its reference numeral is omitted). When a central thickness of the seventh optical lens element 770 is CT7, the following condition is satisfied: CT7=0.60 mm.

In the optical image lens assembly of the 7th embodiment, both of the third optical lens element 730 and the sixth optical lens element 760 include the least one short-wavelength light absorbing agent, and the compositions of the short-wavelength light absorbing agents of the third optical lens element 730 and the sixth optical lens element 760 can be the same or different. Moreover, the third optical lens element 730 among the optical lens elements in order from the object side to the image side includes the least one short-wavelength light absorbing agent.

In the optical image lens assembly of the 7th embodiment, a maximum thickness of the optical lens element including the short-wavelength light absorbing agent is TKmax and a minimum thickness of the optical lens element including the short-wavelength light absorbing agent is TKmin. In the 7th embodiment, the third optical lens element 730 includes the short-wavelength light absorbing agent, and the following conditions are satisfied: TKmax=0.34 mm, TKmin=0.19 mm, and TKmax/TKmin=1.82. The sixth optical lens element 760 includes the short-wavelength light absorbing agent, and the following conditions are satisfied: TKmax=0.95 mm, TKmin=0.37 mm, and TKmax/TKmin=2.52.

In the optical image lens assembly of the 7th embodiment, a sum of central thicknesses of the optical lens elements including the short-wavelength light absorbing agent is sumCTa (in the 7th embodiment, the third optical lens element 730 and the sixth optical lens element 760 include the short-wavelength light absorbing agent, that is, sumC-Tall equals to a central thickness of the third optical lens element 730 plus a central thickness of the sixth optical lens element 760), a sum of central thicknesses of the optical lens elements is sumCT (in the 7th embodiment, sumCT equals to a central thickness of the first optical lens element 710 plus a central thickness of the second optical lens element 720 plus a central thickness of the third optical lens element 730 plus a central thickness of the fourth optical lens element 740 plus a central thickness of the fifth optical lens element 750 plus a central thickness of the sixth optical lens element 760 plus a central thickness of the seventh optical lens element 770), and a maximum of maximum effective diameters of the optical lens elements including the short-wavelength light absorbing agent is φmax (in the 7th embodiment, φmax equals to a maximum effective diameter of the sixth optical lens element 760), the following conditions are satisfied: sumCTa=1.13 mm; φmax=4.25 mm; sumCT=3.46 mm; sumCTa/sumCT=0.33; and φmax/sumCTa=3.76.

The details of the plastic material and the short-wavelength light absorbing agent have been mentioned above, and are not repeated herein.

8th Embodiment

Figure 8:
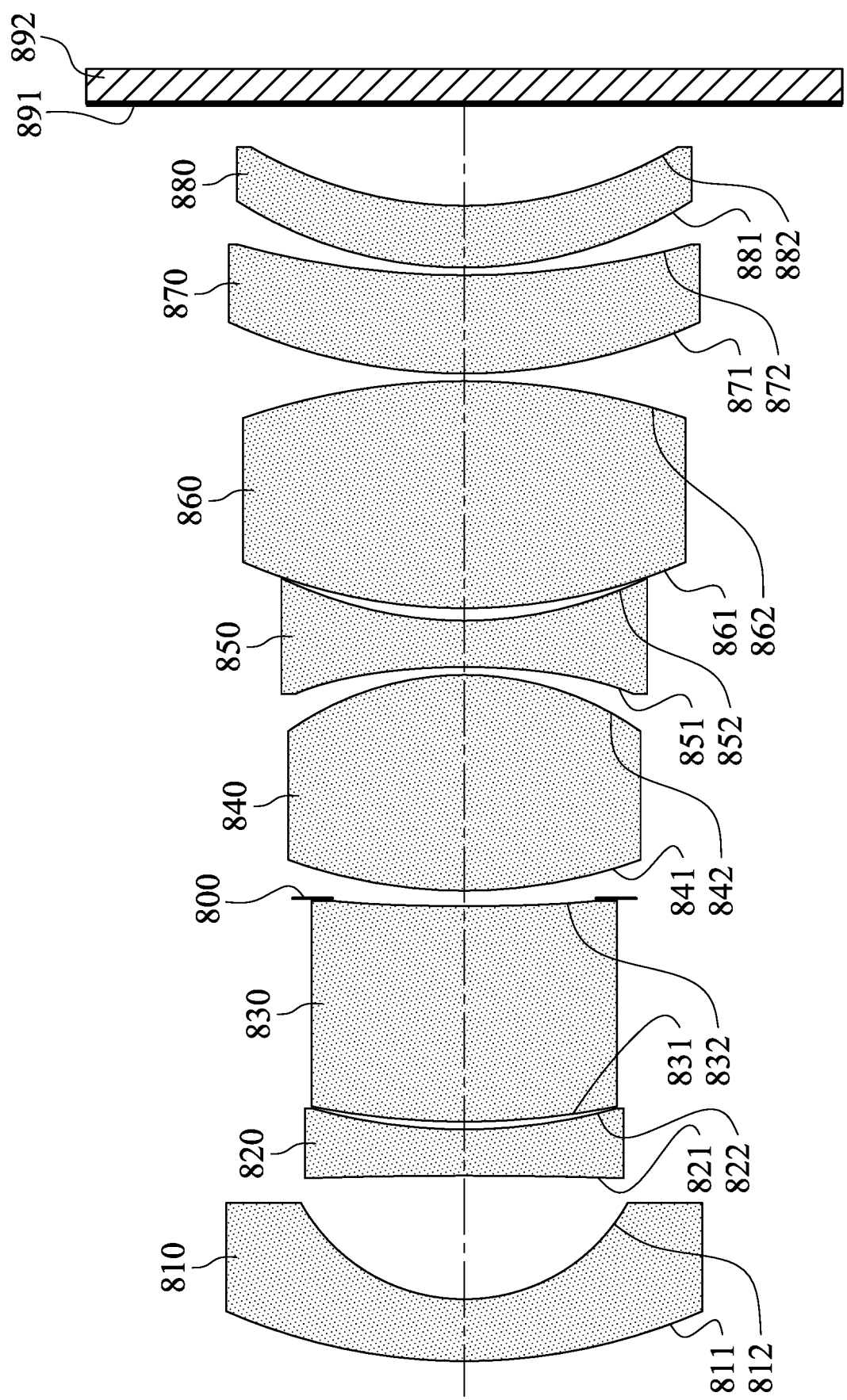
FIG. 8 is a schematic view of an image capturing apparatus according to the 8th embodiment of the present disclosure.

FIG. 8 is a schematic view of an image capturing apparatus according to the 8th embodiment of the present disclosure. In FIG. 8, the image capturing apparatus includes an optical image lens assembly (Its reference numeral is omitted) and an image sensor 892. The optical image lens assembly includes, in order from an object side to an image side, a first optical lens element 810, a second optical lens element 820, a third optical lens element 830, an aperture stop 800, a fourth optical lens element 840, a fifth optical lens element 850, a sixth optical lens element 860, a seventh optical lens element 870, a eighth optical lens element 880 and an image surface 891, wherein the image sensor 892 is disposed on the image surface 891 of the optical image lens assembly. The optical image lens assembly can selectively include other elements, such an IR-cut filter (not shown). The other elements are conventional and will not be described herein.

The first optical lens element 810 with negative refractive power has an object-side surface 811 being convex in a paraxial region thereof and an image-side surface 812 being concave in a paraxial region thereof, and has the object-side surface 811 and the image-side surface 812 being both spherical. The first optical lens element 810 is made of a plastic material (its reference numeral is omitted), and includes at least one short-wavelength light absorbing agent (its reference numeral is omitted). When a central thickness of the first optical lens element 810 including the short-wavelength light absorbing agent is CT1, the following condition is satisfied: CT1=0.40 mm (that is, CT1 is CTa of the first optical lens element 810). When a maximum wavelength correspondent to a 50% transmittance of the first optical lens element 810 including the short-wavelength light absorbing agent is WLT50, the following condition can be satisfied: WLT50≤435 nm. When an average transmittance in a wavelength range of 350 nm-400 nm of the first optical lens element 810 including the short-wavelength light absorbing agent is T3540, an average transmittance in a wavelength range of 400 nm-450 nm of the first optical lens element 810 including the short-wavelength light absorbing agent is T4045, an average transmittance in a wavelength range of 400 nm-500 nm of the first optical lens element 810 including the short-wavelength light absorbing agent is T4050, an average transmittance in a wavelength range of 500 nm-580 nm of the first optical lens element 810 including the short-wavelength light absorbing agent is T5058, an average transmittance in a wavelength range of 580 nm-700 nm of the first optical lens element 810 including the short-wavelength light absorbing agent is T5870, and an average transmittance in a wavelength range of 400 nm-420 nm of the first optical lens element 810 including the short-wavelength light absorbing agent is T4042, the following conditions can be satisfied: T3540≤40%; T4045<90%; 65%≤T4050; 85%≤T5058; 85%≤T5870; and T4042≤50%.

The second optical lens element 820 with negative refractive power has an object-side surface 821 being concave in a paraxial region thereof and an image-side surface 822 being concave in a paraxial region thereof, and has the object-side surface 821 and the image-side surface 822 being both aspheric. The second optical lens element 820 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the second optical lens element 820 including the short-wavelength light absorbing agent is CT2, the following condition is satisfied: CT2=0.30 mm (that is, CT2 is CTa of the second optical lens element 820). When a maximum wavelength correspondent to a 50% transmittance of the second optical lens element 820 including the short-wavelength light absorbing agent is WLT50, the following condition can be satisfied: WLT50≤435 nm. When an average transmittance in a wavelength range of 350 nm-400 nm of the second optical lens element 820 including the short-wavelength light absorbing agent is T3540, an average transmittance in a wavelength range of 400 nm-450 nm of the second optical lens element 820 including the short-wavelength light absorbing agent is T4045, an average transmittance in a wavelength range of 400 nm-500 nm of the second optical lens element 820 including the short-wavelength light absorbing agent is T4050, an average transmittance in a wavelength range of 500 nm-580 nm of the second optical lens element 820 including the short-wavelength light absorbing agent is T5058, an average transmittance in a wavelength range of 580 nm-700 nm of the second optical lens element 820 including the short-wavelength light absorbing agent is T5870, and an average transmittance in a wavelength range of 400 nm-420 nm of the second optical lens element 820 including the short-wavelength light absorbing agent is T4042, the following conditions can be satisfied: T3540≤40%; T4045<90%; 65%≤T4050; 85%≤T5058; 85%≤T5870; and T4042≤50%.

The third optical lens element 830 with positive refractive power has an object-side surface 831 being convex in a paraxial region thereof and an image-side surface 832 being concave in a paraxial region thereof, and has the object-side surface 831 and the image-side surface 832 being both aspheric. The third optical lens element 830 is made of a plastic material (its reference to numeral is omitted), and includes at least one short-wavelength light absorbing agent (its reference numeral is omitted). The short-wavelength light absorbing agent is homogeneously mixed with the plastic material. When a central thickness of the third optical lens element 830 including the short-wavelength light absorbing agent is CT3, the following condition is satisfied: CT3=1.41 mm (that is, CT3 is CTa of the third optical lens element 830). When a maximum wavelength correspondent to a 50% transmittance of the third optical lens element 830 including the short-wavelength light absorbing agent is WLT50, the following condition can be satisfied: WLT50≤435 nm. When an average transmittance in a wavelength range of 350 nm-400 nm of the third optical lens element 830 including the short-wavelength light absorbing agent is T3540, an average transmittance in a wavelength range of 400 nm-450 nm of the third optical lens element 830 including the short-wavelength light absorbing agent is T4045, an average transmittance in a wavelength range of 400 nm-500 nm of the third optical lens element 830 including the short-wavelength light absorbing agent is T4050, an average transmittance in a wavelength range of 500 nm-580 nm of the third optical lens element 830 including the short-wavelength light absorbing agent is T5058, an average transmittance in a wavelength range of 580 nm-700 nm of the third optical lens element 830 including the short-wavelength light absorbing agent is T5870, and an average transmittance in a wavelength range of 400 nm-420 nm of the third optical lens element 830 including the short-wavelength light absorbing agent is T4042, the following conditions can be satisfied: T3540≤40%; T4045<90%; 65%≤T4050; 85%≤T5058; 85%≤T5870; and T4042≤50%.

The fourth optical lens element 840 with positive refractive power has an object-side surface 841 being convex in a paraxial region thereof and an image-side surface 842 being convex in a paraxial region thereof, and has the object-side surface 841 and the image-side surface 842 being both spherical. The fourth optical lens element 840 is made of a plastic material (Its reference numeral is omitted), and includes at least one short-wavelength light absorbing agent (its reference numeral is omitted). The short-wavelength light absorbing agent is homogeneously mixed with the plastic material. When a central thickness of the fourth optical lens element 840 including the short-wavelength light absorbing agent is CT4, the following condition is satisfied: CT4=1.41 mm (that is, CT4 is CTa of the fourth optical lens element 840). When a maximum wavelength correspondent to a 50% transmittance of the fourth optical lens element 840 including the short-wavelength light absorbing agent is WLT50, the following condition can be satisfied: WLT50≤435 nm. When an average transmittance in a wavelength range of 350 nm-400 nm of the fourth optical lens element 840 including the short-wavelength light absorbing agent is T3540, an average transmittance in a wavelength range of 400 nm-450 nm of the fourth optical lens element 840 including the short-wavelength light absorbing agent is T4045, an average transmittance in a wavelength range of 400 nm-500 nm of the fourth optical lens element 840 including the short-wavelength light absorbing agent is T4050, an average transmittance in a wavelength range of 500 nm-580 nm of the fourth optical lens element 840 including the short-wavelength light absorbing agent is T5058, an average transmittance in a wavelength range of 580 nm-700 nm of the fourth optical lens element 840 including the short-wavelength light absorbing agent is T5870, and an average transmittance in a wavelength range of 400 nm-420 nm of the fourth optical lens element 840 including the short-wavelength light absorbing agent is T4042, the following conditions can be satisfied: T3540≤40%; T4045<90%; 65%≤T4050; 85%≤T5058; 85%≤T5870; and T4042≤50%.

The fifth optical lens element 850 with negative refractive power has an object-side surface 851 being concave in a paraxial region thereof and an image-side surface 852 being concave in a paraxial region thereof, and has the object-side surface 851 and the image-side surface 852 being both aspheric. The fifth optical lens element 850 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the fifth optical lens element 850 including the short-wavelength light absorbing agent is CT5, the following condition is satisfied: CT5=0.30 mm (that is, CT5 is CTa of the fifth optical lens element 850). When a maximum wavelength correspondent to a 50% transmittance of the fifth optical lens element 850 including the short-wavelength light absorbing agent is WLT50, the following condition can be satisfied: WLT50≤435 nm. When an average transmittance in a wavelength range of 350 nm-400 nm of the fifth optical lens element 850 including the short-wavelength light absorbing agent is T3540, an average transmittance in a wavelength range of 400 nm-450 nm of the fifth optical lens element 850 including the short-wavelength light absorbing agent is T4045, an average transmittance in a wavelength range of 400 nm-500 nm of the fifth optical lens element 850 including the short-wavelength light absorbing agent is T4050, an average transmittance in a wavelength range of 500 nm-580 nm of the fifth optical lens element 850 including the short-wavelength light absorbing agent is T5058, an average transmittance in a wavelength range of 580 nm-700 nm of the fifth optical lens element 850 including the short-wavelength light absorbing agent is T5870, and an average transmittance in a wavelength range of 400 nm-420 nm of the fifth optical lens element 850 including the short-wavelength light absorbing agent is T4042, the following conditions can be satisfied: T3540≤40%; T4045<90%; 65%≤T4050; 85%≤T5058; 85%≤T5870; and T4042≤50%.

The sixth optical lens element 860 with positive refractive power has an object-side surface 861 being convex in a paraxial region thereof and an image-side surface 862 being convex in a paraxial region thereof, and has the object-side surface 861 and the image-side surface 862 being both spherical. The sixth optical lens element 860 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the sixth optical lens element 860 including the short-wavelength light absorbing agent is CT6, the following condition is satisfied: CT6=1.48 mm (that is, CT6 is CTa of the sixth optical lens element 860). When a maximum wavelength correspondent to a 50% transmittance of the sixth optical lens element 860 including the short-wavelength light absorbing agent is WLT50, the following condition can be satisfied: WLT50≤435 nm. When an average transmittance in a wavelength range of 350 nm-400 nm of the sixth optical lens element 860 including the short-wavelength light absorbing agent is T3540, an average transmittance in a wavelength range of 400 nm-450 nm of the sixth optical lens element 860 including the short-wavelength light absorbing agent is T4045, an average transmittance in a wavelength range of 400 nm-500 nm of the sixth optical lens element 860 including the short-wavelength light absorbing agent is T4050, an average transmittance in a wavelength range of 500 nm-580 nm of the sixth optical lens element 860 including the short-wavelength light absorbing agent is T5058, an average transmittance in a wavelength range of 580 nm-700 nm of the sixth optical lens element 860 including the short-wavelength light absorbing agent is T5870, and an average transmittance in a wavelength range of 400 nm-420 nm of the sixth optical lens element 860 including the short-wavelength light absorbing agent is T4042, the following conditions can be satisfied: T3540≤40%; T4045<90%; 65%≤T4050; 85%≤T5058; 85%≤T5870; and T4042≤50%.

The seventh optical lens element 870 with positive refractive power has an object-side surface 871 being convex in a paraxial region thereof and an image-side surface 872 being concave in a paraxial region thereof, and has the object-side surface 871 and the image-side surface 872 being both spherical. The seventh optical lens element 870 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the seventh optical lens element 870 including the short-wavelength light absorbing agent is CT7, the following condition is satisfied: CT7=0.64 mm (that is, CT7 is CTa of the seventh optical lens element 870). When a maximum wavelength correspondent to a 50% transmittance of the seventh optical lens element 870 including the short-wavelength light absorbing agent is WLT50, the following condition can be satisfied: WLT50≤435 nm. When an average transmittance in a wavelength range of 350 nm-400 nm of the seventh optical lens element 870 including the short-wavelength light absorbing agent is T3540, an average transmittance in a wavelength range of 400 nm-450 nm of the seventh optical lens element 870 including the short-wavelength light absorbing agent is T4045, an average transmittance in a wavelength range of 400 nm-500 nm of the seventh optical lens element 870 including the short-wavelength light absorbing agent is T4050, an average transmittance in a wavelength range of 500 nm-580 nm of the seventh optical lens element 870 including the short-wavelength light absorbing agent is T5058, an average transmittance in a wavelength range of 580 nm-700 nm of the seventh optical lens element 870 including the short-wavelength light absorbing agent is T5870, and an average transmittance in a wavelength range of 400 nm-420 nm of the seventh optical lens element 870 including the short-wavelength light absorbing agent is T4042, the following conditions can be satisfied: T3540≤40%; T4045<90%; 65%≤T4050; 85%≤T5058; 85%≤T5870; and T4042≤50%.

The eighth optical lens element 880 with negative refractive power has an object-side surface 881 being convex in a paraxial region thereof and an image-side surface 882 being concave in a paraxial region thereof, and has the object-side surface 881 and the image-side surface 882 being both spherical. The eighth optical lens element 880 is made of a plastic material (its reference numeral is omitted), and includes at least one short-wavelength light absorbing agent (its reference numeral is omitted). The short-wavelength light absorbing agent is homogeneously mixed with the plastic material. When a central thickness of the eighth optical lens element 880 including the short-wavelength light absorbing agent is CT8, the following condition is satisfied: CT8=0.40 mm (that is, CT8 is CTa of the eighth optical lens element 880). When a maximum wavelength correspondent to a 50% transmittance of the eighth optical lens element 880 including the short-wavelength light absorbing agent is WLT50, the following condition can be satisfied: WLT50≤435 nm. When an average transmittance in a wavelength range of 350 nm-400 nm of the eighth optical lens element 880 including the short-wavelength light absorbing agent is T3540, an average transmittance in a wavelength range of 400 nm-450 nm of the eighth optical lens element 880 including the short-wavelength light absorbing agent is T4045, an average transmittance in a wavelength range of 400 nm-500 nm of the eighth optical lens element 880 including the short-wavelength light absorbing agent is T4050, an average transmittance in a wavelength range of 500 nm-580 nm of the eighth optical lens element 880 including the short-wavelength light absorbing agent is T5058, an average transmittance in a wavelength range of 580 nm-700 nm of the eighth optical lens element 880 including the short-wavelength light absorbing agent is T5870, and an average transmittance in a wavelength range of 400 nm-420 nm of the eighth optical lens element 880 including the short-wavelength light absorbing agent is T4042, the following conditions can be satisfied: T3540≤40%; T4045<90%; 65%≤T4050; 85%≤T5058; 85%≤T5870; and T4042≤50%.

In the optical image lens assembly of the 8th embodiment, the first optical lens element 810, the second optical lens element 820, the third optical lens element 830, the fourth optical lens element 840, the fifth optical lens element 850, the sixth optical lens element 860, the seventh optical lens element 870 and the eighth optical lens element 880 all include the least one short-wavelength light absorbing agent, and the compositions of the short-wavelength light absorbing agents of the first optical lens element 810, the second optical lens element 820, the third optical lens element 830, the fourth optical lens element 840, the fifth optical lens element 850, the sixth optical lens element 860, the seventh optical lens element 870 and the eighth optical lens element 880 can be the same or different. Moreover, the first optical lens element 810 closest to the object side includes the least one short-wavelength light absorbing agent, and the second optical lens element 820 and the third optical lens element 830 among the optical lens elements in order from the object side to the image side include the least one short-wavelength light absorbing agent.

In the optical image lens assembly of the 8th embodiment, a maximum thickness of the optical lens element including the short-wavelength light absorbing agent is TKmax and a minimum thickness of the optical lens element including the short-wavelength light absorbing agent is TKmin. In the 8th embodiment, the first optical lens element 810 includes the short-wavelength light absorbing agent, and the following conditions are satisfied: TKmax=0.88 mm, TKmin=0.40 mm, and TKmax/TKmin=2.19. The second optical lens element 820 includes the short-wavelength light absorbing agent, and the following conditions are satisfied: TKmax=0.46 mm, TKmin=0.30 mm, and TKmax/TKmin=1.51. The third optical lens element 830 includes the short-wavelength light absorbing agent, and the following conditions are satisfied: TKmax=1.41 mm, TKmin=1.34 mm, and TKmax/TKmin=1.05. The fourth optical lens element 840 includes the short-wavelength light absorbing agent, and the following conditions are satisfied: TKmax=1.41 mm, TKmin=0.84 mm, and TKmax/TKmin=1.68. The fifth optical lens element 850 includes the short-wavelength light absorbing agent, and the following conditions are satisfied: TKmax=0.76 mm, TKmin=0.30 mm, and TKmax/TKmin=2.50. The sixth optical lens element 860 includes the short-wavelength light absorbing agent, and the following conditions are satisfied: TKmax=1.48 mm, TKmin=0.94 mm, and TKmax/TKmin=1.58. The seventh optical lens element 870 includes the short-wavelength light absorbing agent, and the following conditions are satisfied: TKmax=0.64 mm, TKmin=0.51 mm, and TKmax/TKmin=1.27. The eighth optical lens element 880 includes the short-wavelength light absorbing agent, and the following conditions are satisfied: TKmax=0.40 mm, TKmin=0.35 mm, and TKmax/TKmin=1.14.

In the optical image lens assembly of the 8th embodiment, a sum of central thicknesses of the optical lens elements including the short-wavelength light absorbing agent is sumCTa (in the 8th embodiment, the first optical lens element 810, the second optical lens element 820, the third optical lens element 830, the fourth optical lens element 840, the fifth optical lens element 850, the sixth optical lens element 860, the seventh optical lens element 870 and the eighth optical lens element 880 include the short-wavelength light absorbing agent, that is, sumCTa equals to a central thickness of the first optical lens element 810 plus a central thickness of the second optical lens element 820 plus a central thickness of the third optical lens element 830 plus a central thickness of the fourth optical lens element 840 plus a central thickness of the fifth optical lens element 850 plus a central thickness of the sixth optical lens element 860 plus a central thickness of the seventh optical lens element 870 plus a central thickness of the eighth optical lens element 880), a sum of central thicknesses of the optical lens elements is sumCT (in the 8th embodiment, sumCT equals to a central thickness of the first optical lens element 810 plus a central thickness of the second optical lens element 820 plus a central thickness of the third optical lens element 830 plus a central thickness of the fourth optical lens element 840 plus a central thickness of the fifth optical lens element 850 plus a central thickness of the sixth optical lens element 860 plus a central thickness of the seventh optical lens element 870 plus and a central thickness of the eighth optical lens element 880), and a maximum of maximum effective diameters of the optical lens elements including the short-wavelength light absorbing agent is φmax (in the 8th embodiment, φmax equals to a maximum effective diameter of the first optical lens element 810), the following conditions are satisfied: sumCTa=6.35 mm; φmax=3.10 mm; sumCT=6.35 mm; sumCTa/sumCT=1; and φmax/sumCTa=0.49.

The details of the plastic material and the short-wavelength light absorbing agent have been mentioned above, and are not repeated herein.

As shown in the 1st embodiment to the 8th embodiment, the optical image lens assembly can include at least one optical lens element including at least one short-wavelength light absorbing agent, so that the short wavelength lights can be effectively absorbed. Furthermore, when the optical image lens assembly includes a plurality of optical lens elements, the optical image lens assembly can also include a plurality of optical lens elements including the short-wavelength light absorbing agent, and the short-wavelength light absorbing agents of different optical lens elements can be the same or different. Moreover, the position of the optical lens element including the short-wavelength light absorbing agent can be adjusted according to practical demands.

9th Embodiment

Figure 9:
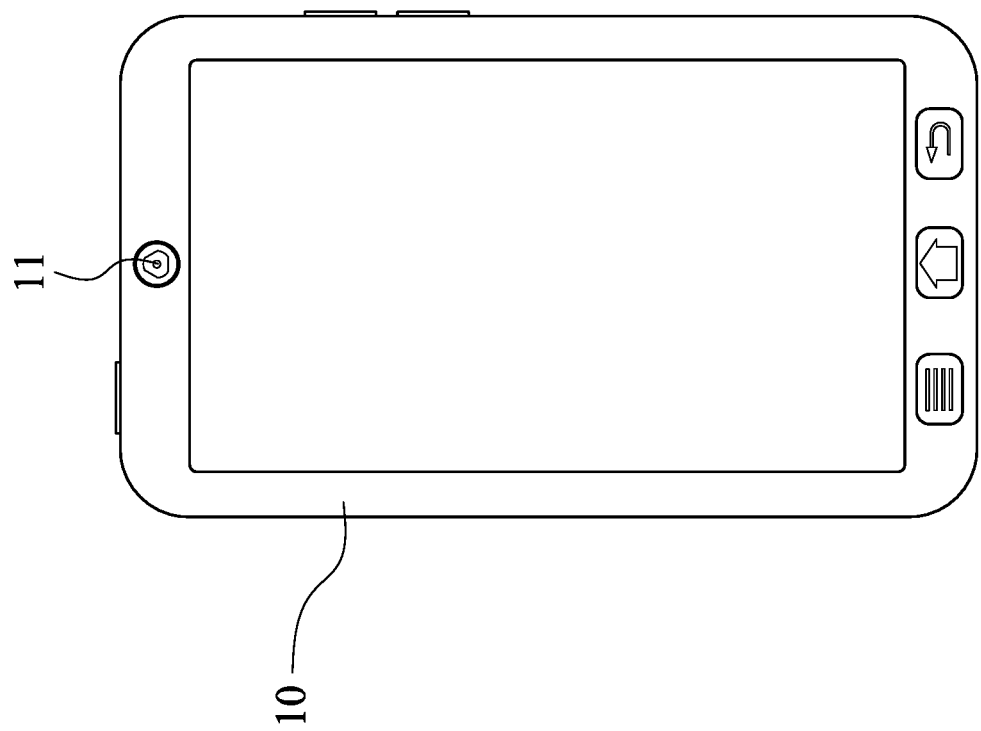
FIG. 9 is a schematic view of an electronic device according to the 9th embodiment of the present disclosure.

FIG. 9 is a schematic view of an electronic device 10 according to the 9th embodiment of the present disclosure. The electronic device 10 of the 9th embodiment is a smart phone, wherein the electronic device 10 includes an image capturing apparatus 11. The image capturing apparatus 11 includes an optical image lens assembly (not shown herein) according to the present disclosure and an image sensor (not shown herein), wherein the image sensor is disposed on an image surface of the optical image lens assembly.

10th Embodiment

Figure 10:
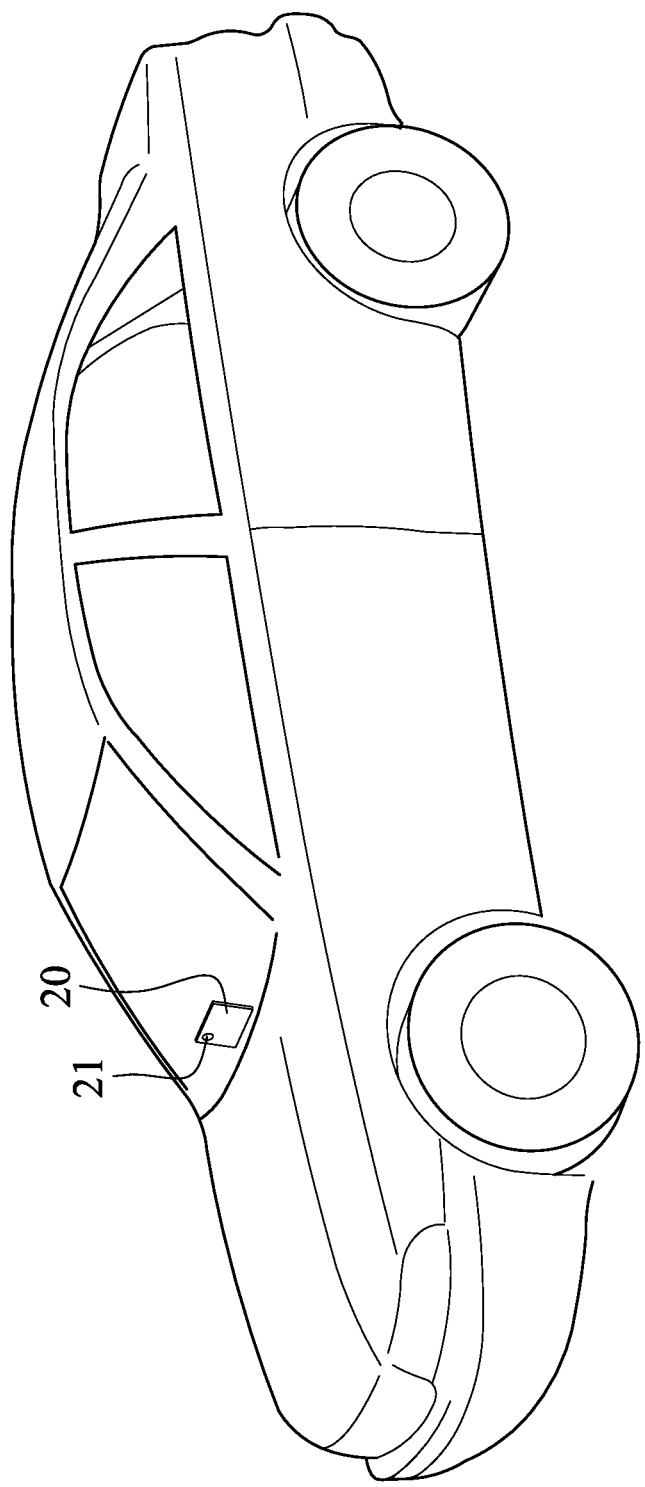
FIG. 10 is a schematic view of an electronic device according to the 10th embodiment of the present disclosure.

FIG. 10 is a schematic view of an electronic device 20 according to the 10th embodiment of the present disclosure. The electronic device 20 of the 10th embodiment is a vehicle photographing system, wherein the electronic device 20 includes an image capturing apparatus 21. The image capturing apparatus 21 includes an optical image lens assembly (not shown herein) according to the present disclosure and an image sensor (not shown herein), wherein the image sensor is disposed on an image surface of the optical image lens assembly.

According to the above description of the present disclosure, the following specific examples are provided for further explanation.

Example 1

Example 1 is an optical lens element including a short-wavelength light absorbing agent, the names of the materials of the optical lens element are shown in Table 1.

TABLE 1

| | name |
|---|---|
| plastic material | PC |
| short-wavelength light absorbing agent (commercial name) | Tinuvin 477 |

In Example 1, a maximum wavelength correspondent to a 50% transmittance of the optical lens element including the short-wavelength light absorbing agent is WLT50. An average transmittance in a wavelength range of 350 nm-400 nm of the optical lens element including the short-wavelength light absorbing agent is T3540. An average transmittance in a wavelength range of 400 nm-450 nm of the optical lens element including the short-wavelength light absorbing agent is T4045. An average transmittance in a wavelength range of 400 nm-500 nm of the optical lens element including the short-wavelength light absorbing agent is T4050. An average transmittance in a wavelength range of 500 nm-580 nm of the optical lens element including the short-wavelength light absorbing agent is T5058. An average transmittance in a wavelength range of 580 nm-700 nm of the optical lens element including the short-wavelength light absorbing agent is T5870. An average transmittance in a wavelength range of 400 nm-420 nm of the optical lens element including the short-wavelength light absorbing agent is T4042. The values of WLT50, T3540, T4045, T4050, T5058, T5870 and T4042 are listed in Table 2. The values in Table 2 are measured when a central thickness of the optical lens element equals to 0.25 mm.

TABLE 2

| WLT50 (nm) | T4050 (%) | T5058 (%) | T5870 (%) | T3540 (%) | T4042 (%) | T4045 (%) |
|---|---|---|---|---|---|---|
| 395 | 90.0 | 91.7 | 91.6 | 14.86 | 82.68 | 87.89 |

Figure 11:
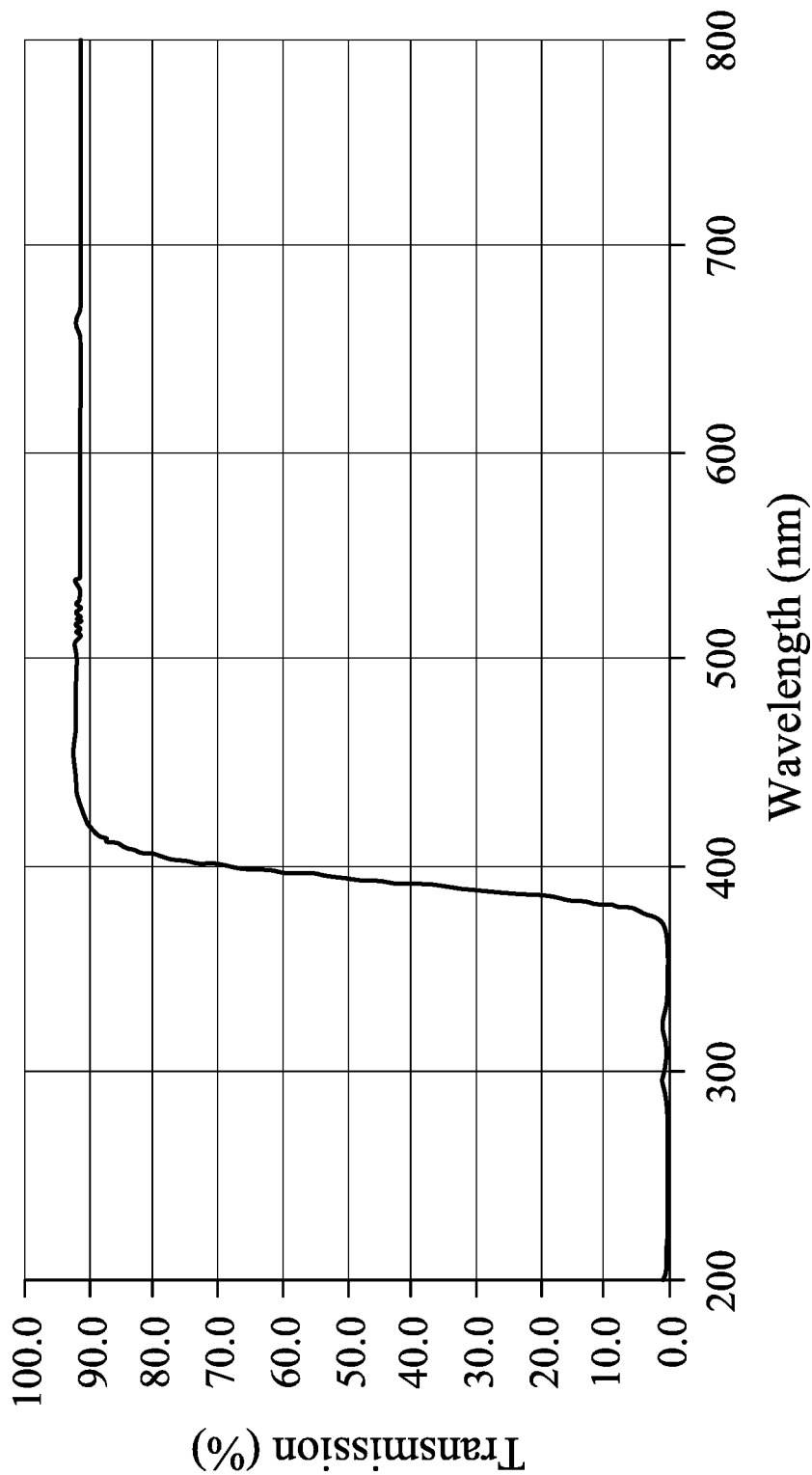
FIG. 11 shows a relationship of transmission and wavelength of Example 1 according to the present disclosure.

FIG. 11 shows a relationship of transmission and wavelength of Example 1 according to the present disclosure. As shown in FIG. 11, the optical lens element of Example 1 can effectively absorb UVB and a large portion of UVA.

Example 2

Example 2 is an optical lens element including a short-wavelength light absorbing agent, the names of the materials of the optical lens element are shown in Table 3.

TABLE 3

| | name |
|---|---|
| plastic material | PC |
| short-wavelength light absorbing agent (commercial name) | UV-390 |

In Example 2, the values of WLT50, T3540, T4045, T4050, T5058, T5870 and T4042 are listed in Table 4. The definitions of WLT50, T3540, T4045, T4050, T5058, T5870 and T4042 are the same as that in Example 1, and are not repeated herein. The values in Table 4 are measured when a central thickness of the optical lens element equals to 0.25 mm.

TABLE 4

| WLT50 (nm) | T4050 (%) | T5058 (%) | T5870 (%) | T3540 (%) | T4042 (%) | T4045 (%) |
|---|---|---|---|---|---|---|
| 434 | 65.1 | 90.7 | 90.5 | 24.03 | 21.75 | 40.85 |

Figure 12:
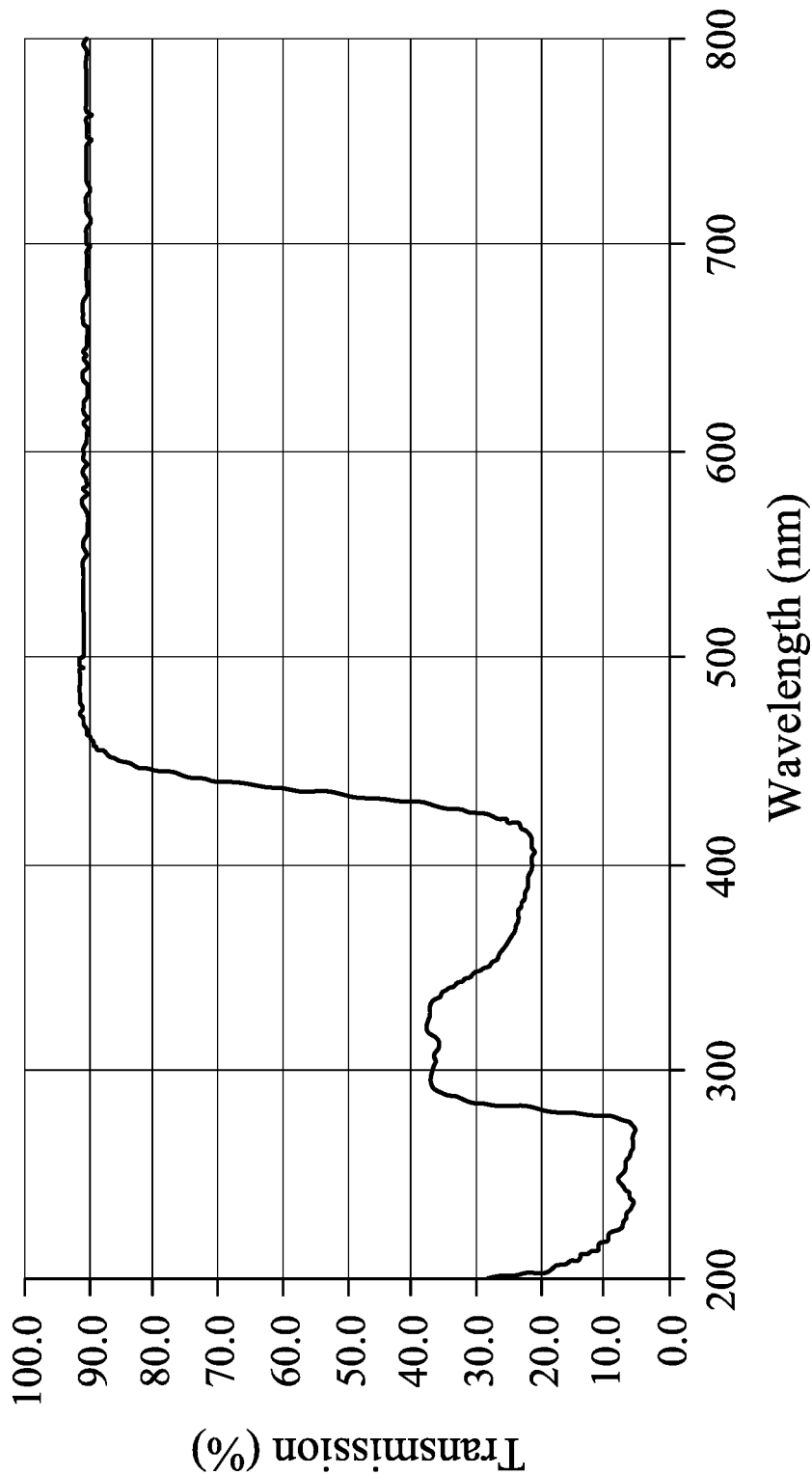
FIG. 12 shows a relationship of transmission and wavelength of Example 2 according to the present disclosure.

FIG. 12 shows a relationship of transmission and wavelength of Example 2 according to the present disclosure. As shown in FIG. 12, the optical lens element of Example 2 can effectively absorb UVB, UVA and high-energy blue lights. When the high-energy blue lights are absorbed, the purple fringing of the image can be prevented, which can further enhance the image quality.

Example 3

Example 3 is an optical lens element including a short-wavelength light absorbing agent, the names of the materials of the optical lens element are shown in Table 5.

TABLE 5

| | name |
|---|---|
| plastic material | COC |
| short-wavelength light absorbing agent (commercial name) | UV-390 |

In Example 3, the values of WLT50, T3540, T4045, T4050, T5058, T5870 and T4042 are listed in Table 6. The definitions of WLT50, T3540, T4045, T4050, T5058, T5870 and T4042 are the same as that in Example 1, and are not repeated herein. The values in Table 6 are measured when a central thickness of the optical lens element equals to 0.25 mm.

TABLE 6

| WLT50 (nm) | T4050 (%) | T5058 (%) | T5870 (%) | T3540 (%) | T4042 (%) | T4045 (%) |
|---|---|---|---|---|---|---|
| 429 | 68.3 | 91.1 | 91.4 | 23.28 | 21.37 | 47.27 |

Figure 13:
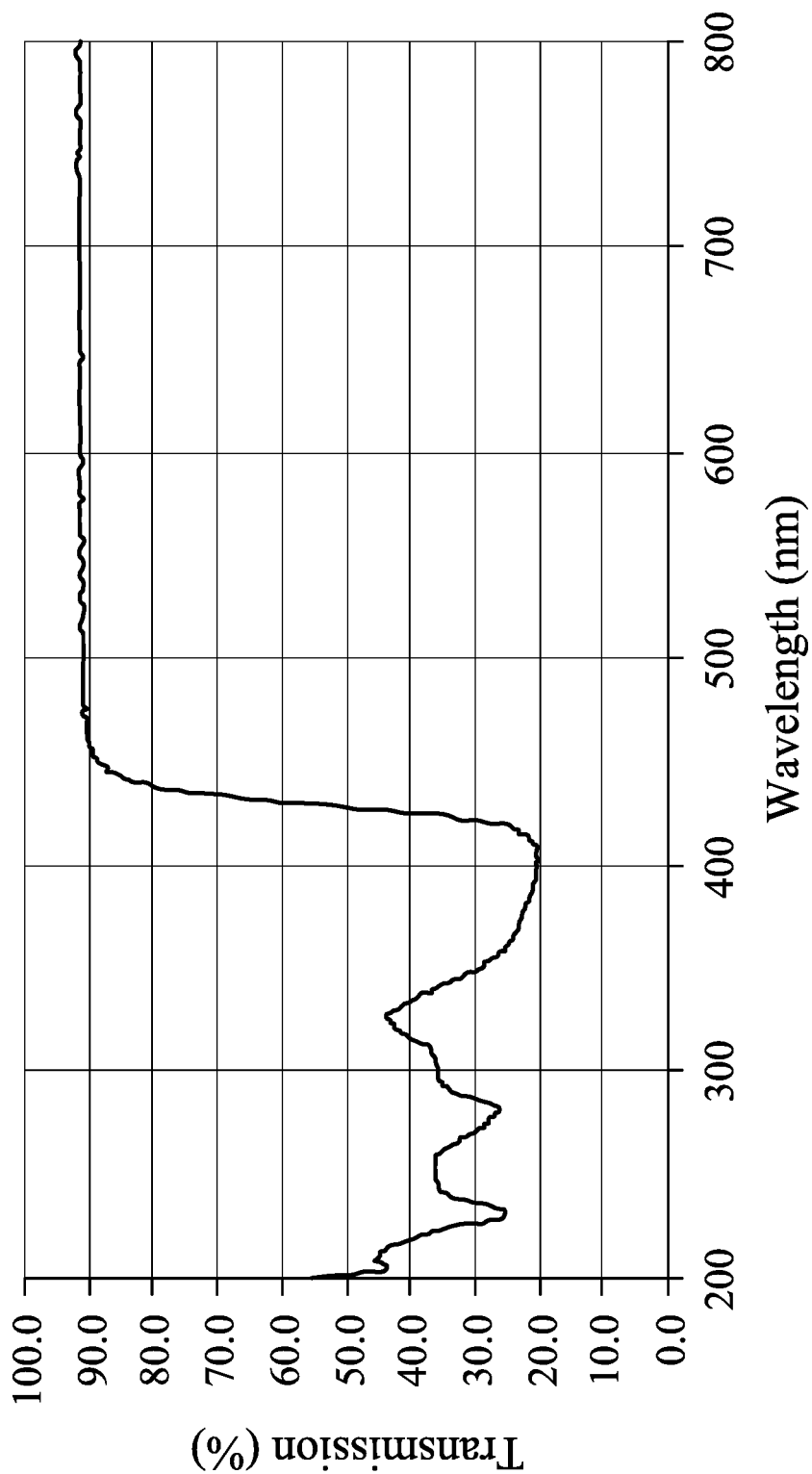
FIG. 13 shows a relationship of transmission and wavelength of Example 3 according to the present disclosure.

FIG. 13 shows a relationship of transmission and wavelength of Example 3 according to the present disclosure. As shown in FIG. 13, the optical lens element of Example 3 can effectively absorb UVB, UVA and a portion of high-energy blue lights. When the portion of the high-energy blue lights are absorbed, the purple fringing of the image can be prevented, which can further enhance the image quality.

Example 4

Example 4 is an optical lens element including a short-wavelength light absorbing agent, the names of the materials of the optical lens element are shown in Table 7, in which UV-326 includes 2-(2'-hydroxy-3'-t-butyl-5'-methylphenyl)-5-chlorobenzotriazole.

TABLE 7

| | name |
|---|---|
| plastic material | PC |
| short-wavelength light absorbing agent (commercial name) | UV-326 |

In Example 4, the values of WLT50, T3540, T4045, T4050, T5058, T5870 and T4042 are listed in Table 8. The definitions of WLT50, T3540, T4045, T4050, T5058, T5870 and T4042 are the same as that in Example 1, and are not repeated herein. The values in Table 8 are measured when a central thickness of the optical lens element equals to 0.25 mm.

TABLE 8

| WLT50 (nm) | T4050 (%) | T5058 (%) | T5870 (%) | T3540 (%) | T4042 (%) | T4045 (%) |
|---|---|---|---|---|---|---|
| 401 | 87.2 | 90.5 | 90.3 | 6.62 | 73.14 | 83.55 |

Figure 14:
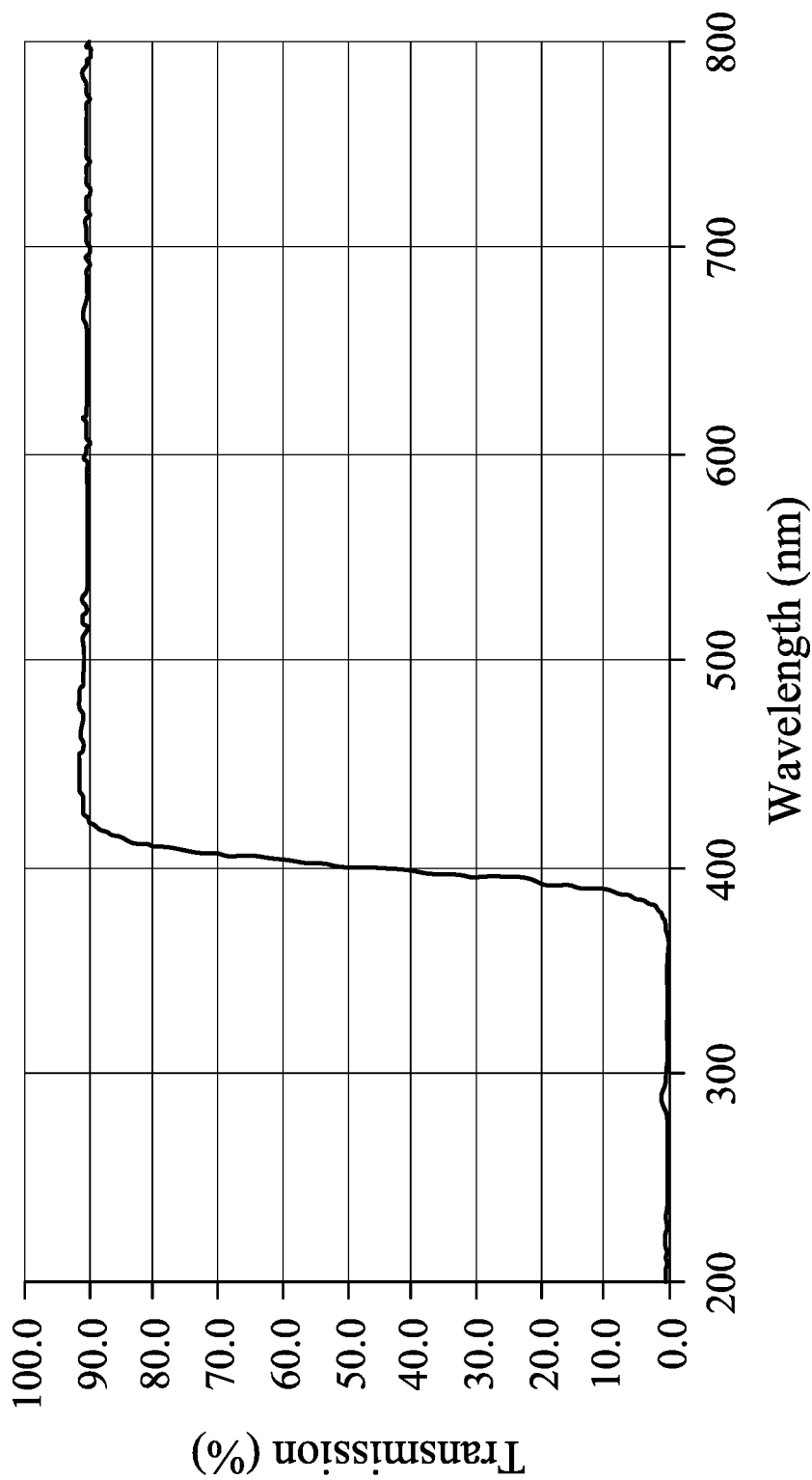
FIG. 14 shows a relationship of transmission and wavelength of Example 4 according to the present disclosure.

FIG. 14 shows a relationship of transmission and wavelength of Example 4 according to the present disclosure. As shown in FIG. 14, the optical lens element of Example 4 can effectively absorb UVB and UVA.

Example 5

Example 5 is an optical lens element including a short-wavelength light absorbing agent, the names of the materials of the optical lens element are shown in Table 9, in which LA-31 includes 2,2'-methylenebis[6-(2H-benzotriazol-2-yl)-4-(1,1,3,3-tetramethylbutyl)phenol].

TABLE 9

| | name |
|---|---|
| plastic material | PC |
| short-wavelength light absorbing agent (commercial name) | LA-31 |

In Example 5, the values of WLT50, T3540, T4045, T4050, T5058, T5870 and T4042 are listed in Table 10. The definitions of WLT50, T3540, T4045, T4050, T5058, T5870 and T4042 are the same as that in Example 1, and are not repeated herein. The values in Table 10 are measured when a central thickness of the optical lens element equals to 0.25 mm.

TABLE 10

| WLT50 (nm) | T4050 (%) | T5058 (%) | T5870 (%) | T3540 (%) | T4042 (%) | T4045 (%) |
|---|---|---|---|---|---|---|
| 388 | 88.6 | 89.5 | 89.8 | 24.28 | 86.76 | 87.97 |

Figure 15:
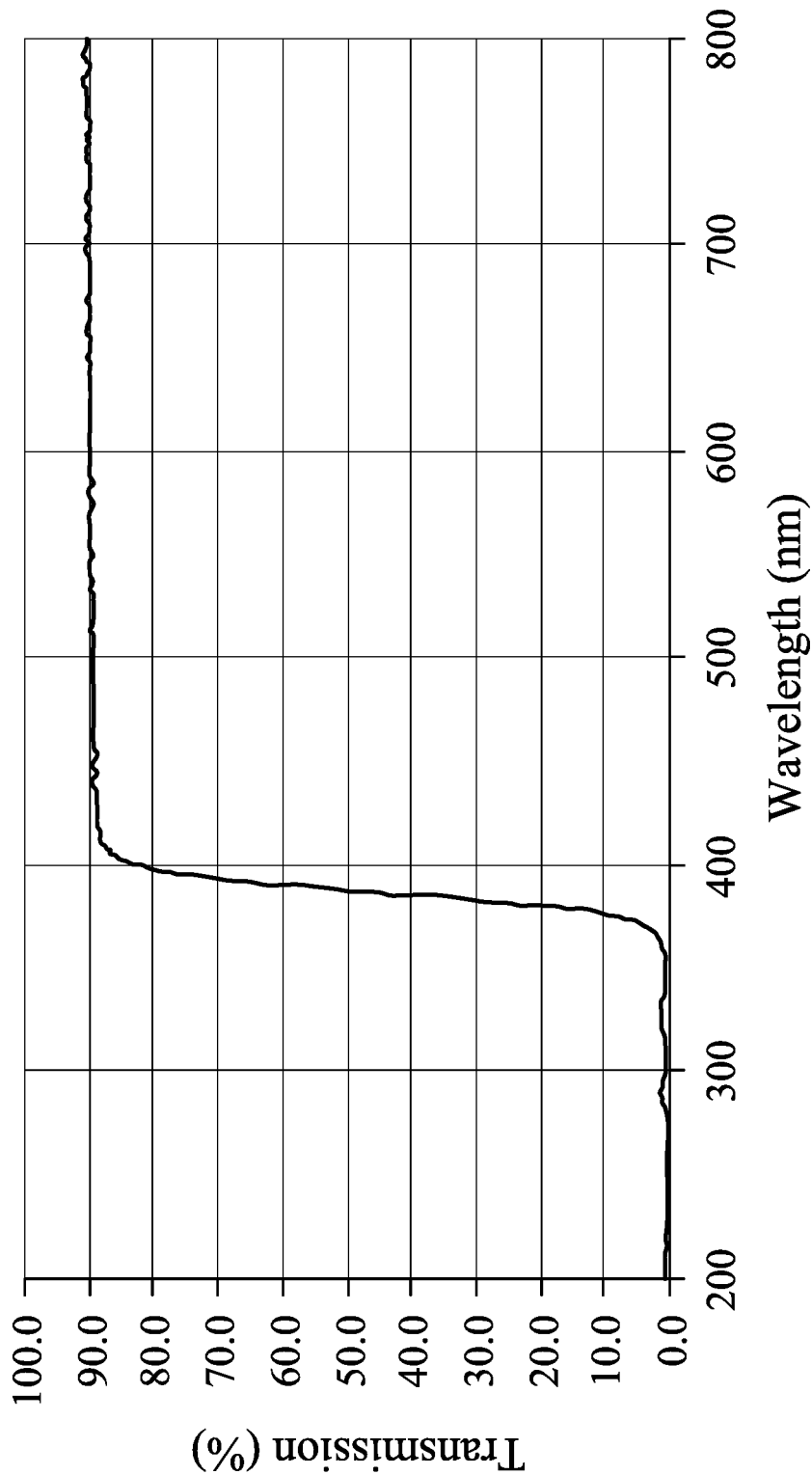
FIG. 15 shows a relationship of transmission and wavelength of Example 5 according to the present disclosure.

FIG. 15 shows a relationship of transmission and wavelength of Example 5 according to the present disclosure. As shown in FIG. 15, the optical lens element of Example 5 can effectively absorb UVB and a large portion of UVA.

Example 6

Example 6 is an optical lens element including a short-wavelength light absorbing agent, the names of the materials of the optical lens element are shown in Table 11.

TABLE 11

| | name |
|---|---|
| plastic material | PC |
| short-wavelength light absorbing agent (commercial name) | Omnistab 46 |

In Example 6, the values of WLT50, T3540, T4045, T4050, T5058, T5870 and T4042 are listed in Table 12. The definitions of WLT50, T3540, T4045, T4050, T5058, T5870 and T4042 are the same as that in Example 1, and are not repeated herein. The values in Table 12 are measured when a central thickness of the optical lens element equals to 0.25 mm.

TABLE 12

| WLT50 (nm) | T4050 (%) | T5058 (%) | T5870 (%) | T3540 (%) | T4042 (%) | T4045 (%) |
|---|---|---|---|---|---|---|
| 416 | 74.7 | 89.3 | 89.3 | 1.68 | 31.08 | 60.32 |

Figure 16:
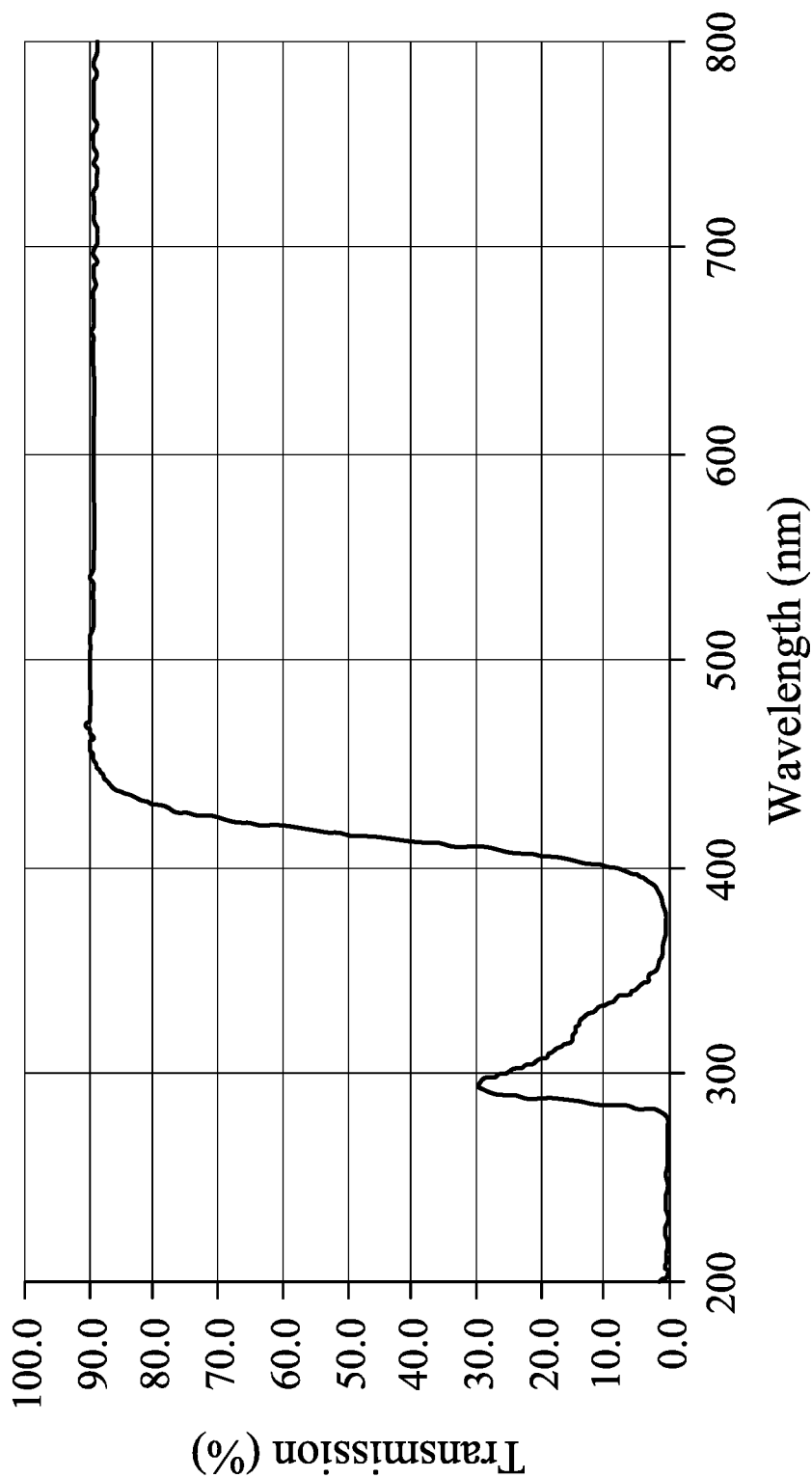
FIG. 16 shows a relationship of transmission and wavelength of Example 6 according to the present disclosure.

FIG. 16 shows a relationship of transmission and wavelength of Example 6 according to the present disclosure. As shown in FIG. 16, the optical lens element of Example 6 can effectively absorb UVB, UVA and a portion of high-energy blue lights. When the portion of the high-energy blue lights are absorbed, the purple fringing of the image can be prevented, which can further enhance the image quality.

Example 7

Example 7 is an optical lens element including a short-wavelength light absorbing agent, the names of the materials of the optical lens element are shown in Table 13, in which Sumisorb 340 includes 2-(2'-Hydroxy-5'-t-octylphenyl)benzotriazole.

TABLE 13

| | name |
|---|---|
| plastic material | PC |
| short-wavelength light absorbing agent (commercial name) | Sumisorb 340 |

In Example 7, the values of WLT50, T3540, T4045, T4050, T5058, T5870 and T4042 are listed in Table 14. The definitions of WLT50, T3540, T4045, T4050, T5058, T5870 and T4042 are the same as that in Example 1, and are not repeated herein. The values in Table 14 are measured when a central thickness of the optical lens element equals to 0.25 mm.

TABLE 14

| WLT50 (nm) | T4050 (%) | T5058 (%) | T5870 (%) | T3540 (%) | T4042 (%) | T4045 (%) |
|---|---|---|---|---|---|---|
| 380 | 88.7 | 89.3 | 89.6 | 38.27 | 88.07 | 88.38 |

Figure 17:
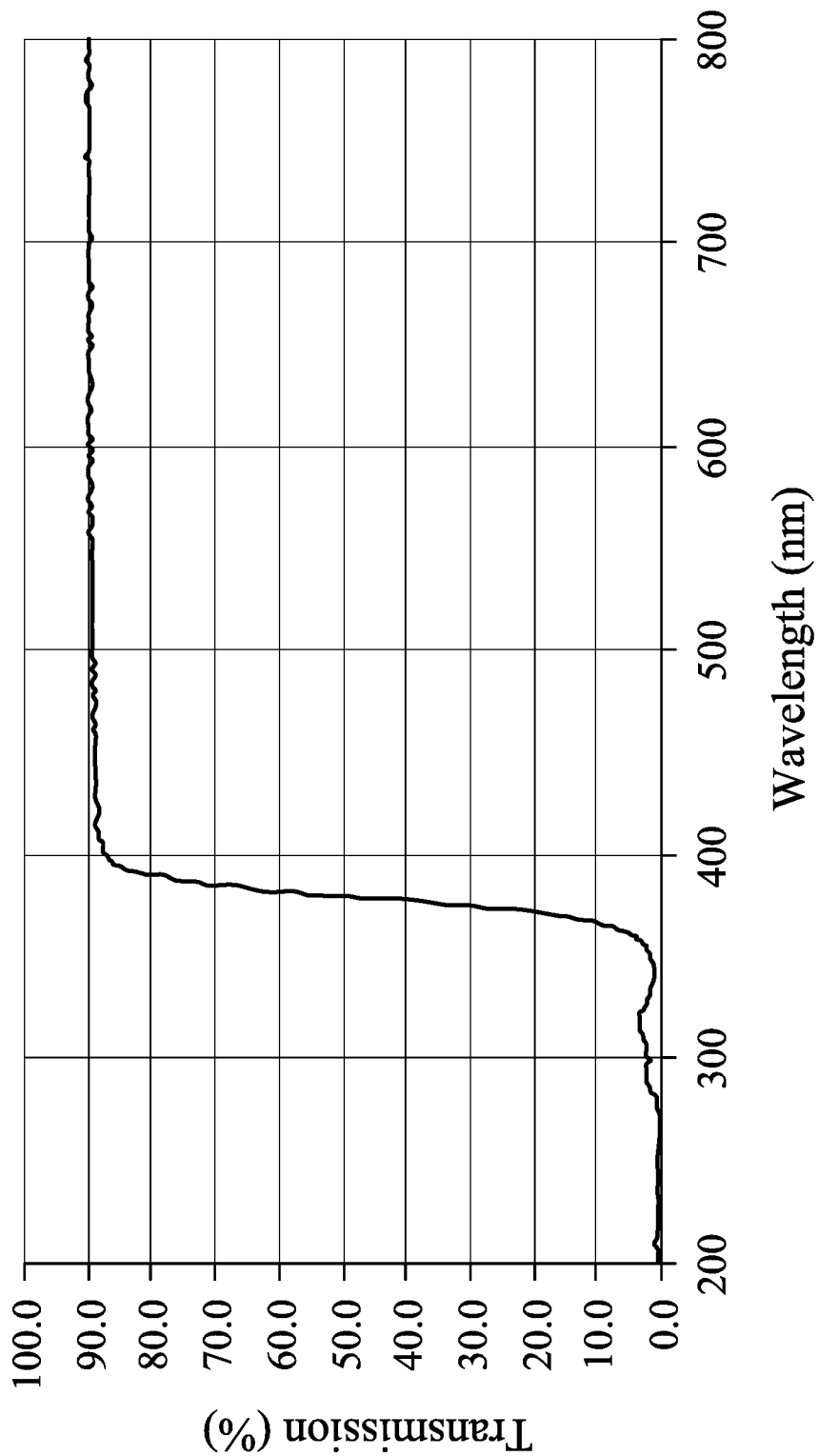
FIG. 17 shows a relationship of transmission and wavelength of Example 7 according to the present disclosure.

FIG. 17 shows a relationship of transmission and wavelength of Example 7 according to the present disclosure. As shown in FIG. 17, the optical lens element of Example 7 can effectively absorb UVB and a large portion of UVA.

Example 8

Example 8 is an optical lens element including short-wavelength light absorbing agents, the names of the materials of the optical lens element are shown in Table 15, in which LA-31 includes 2,2'-methylenebis[6-(2H-benzotriazol-2-yl)-4-(1,1,3,3-tetramethylbutyl)phenol].

TABLE 15

| | name |
|---|---|
| plastic material | PC |
| short-wavelength light absorbing agent (commercial name) | UV-390 |
| short-wavelength light absorbing agent (commercial name) | LA-31 |

In Example 8, the values of WL50, T3540, T4045, T4050, T5058, T5870 and T4042 are listed in Table 16. The definitions of WLT50, T3540, T4045, T4050, T5058, T5870 and T4042 are the same as that in Example 1, and are not repeated herein. The values in Table 16 are measured when a central thickness of the optical lens element equals to 0.25 mm.

TABLE 16

| WLT50 (nm) | T4050 (%) | T5058 (%) | T5870 (%) | T3540 (%) | T4042 (%) | T4045 (%) |
|---|---|---|---|---|---|---|
| 421 | 72.0 | 88.6 | 89.2 | 16.03 | 38.67 | 56.98 |

Figure 18:
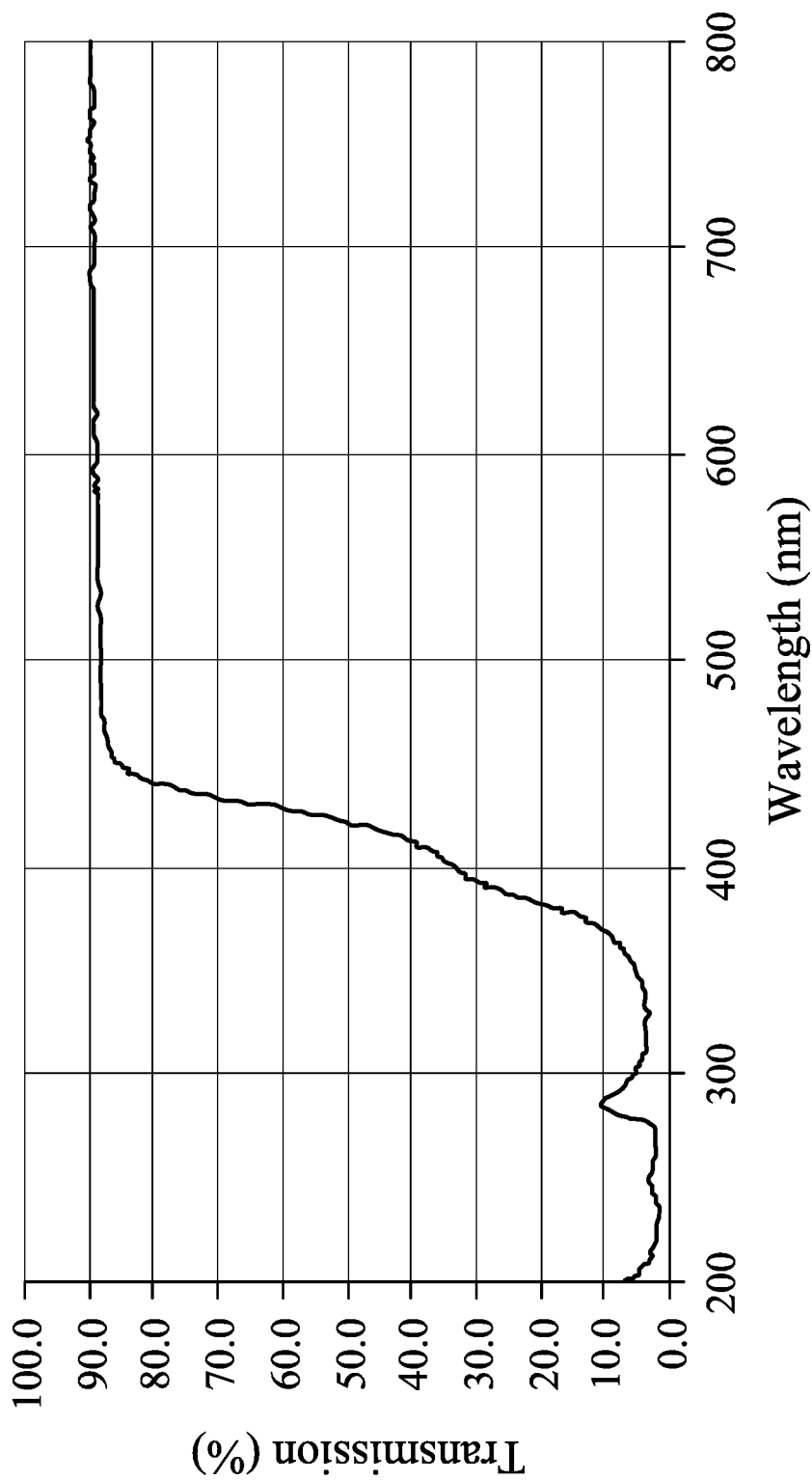
FIG. 18 shows a relationship of transmission and wavelength of Example 8 according to the present disclosure.

FIG. 18 shows a relationship of transmission and wavelength of Example 8 according to the present disclosure. As shown in FIG. 18, the optical lens element of Example 8 can effectively absorb UVB, UVA and a portion of high-energy blue lights. When the portion of the high-energy blue lights are absorbed, the purple fringing of the image can be prevented, which can further enhance the image quality.

Additionally, the aforementioned plastic material including short-wavelength light absorbing agents can be replaced with the materials shown in Table 17.

TABLE 17

| NO. | 1 | 2 | 3 | 4 | 5 | 6 |
|---|---|---|---|---|---|---|
| refractive index (N) | 1.512 | 1.566 | 1.614 | 1.657 | 1.535 | 1.544 |
| Abbe number (V) | 57.0 | 37.5 | 25.9 | 21.2 | 55.0 | 56.0 |
| transmittance (T, %) | 93 | — | — | — | 92 | 90 |
| haze value (Hz, %) | 0.3 | — | — | — | — | 0.5 |
| glass transition temperature (Tg, °C.) | 164 | 135 | 145 | 155 | 143 | 145 |
| plastic material | COC/COP | PC | PC | PC | COC/COP | COC/COP |

Comparative Example 1

Comparative Example 1 is an optical lens element without a short-wavelength light absorbing agent, the name of the material of the optical lens element are shown in Table 18.

TABLE 18

| | name |
|---|---|
| plastic material | PC |

In Comparative Example 1, the values of WLT50, T3540, T4045, T4050, T5058, T5870 and T4042 are listed in Table 19. The definitions of WLT50, T3540, T4045, T4050, T5058, T5870 and T4042 are the same as that in Example 1, and are not repeated herein. The values in Table 19 are measured when a central thickness of the optical lens element equals to 0.25 mm.

TABLE 19

| WLT50 (nm) | T4050 (%) | T5058 (%) | T5870 (%) | T3540 (%) | T4042 (%) | T4045 (%) |
|---|---|---|---|---|---|---|
| 291 | 91.3 | 90.5 | 90.2 | 90.55 | 91.57 | 91.49 |

Figure 19:
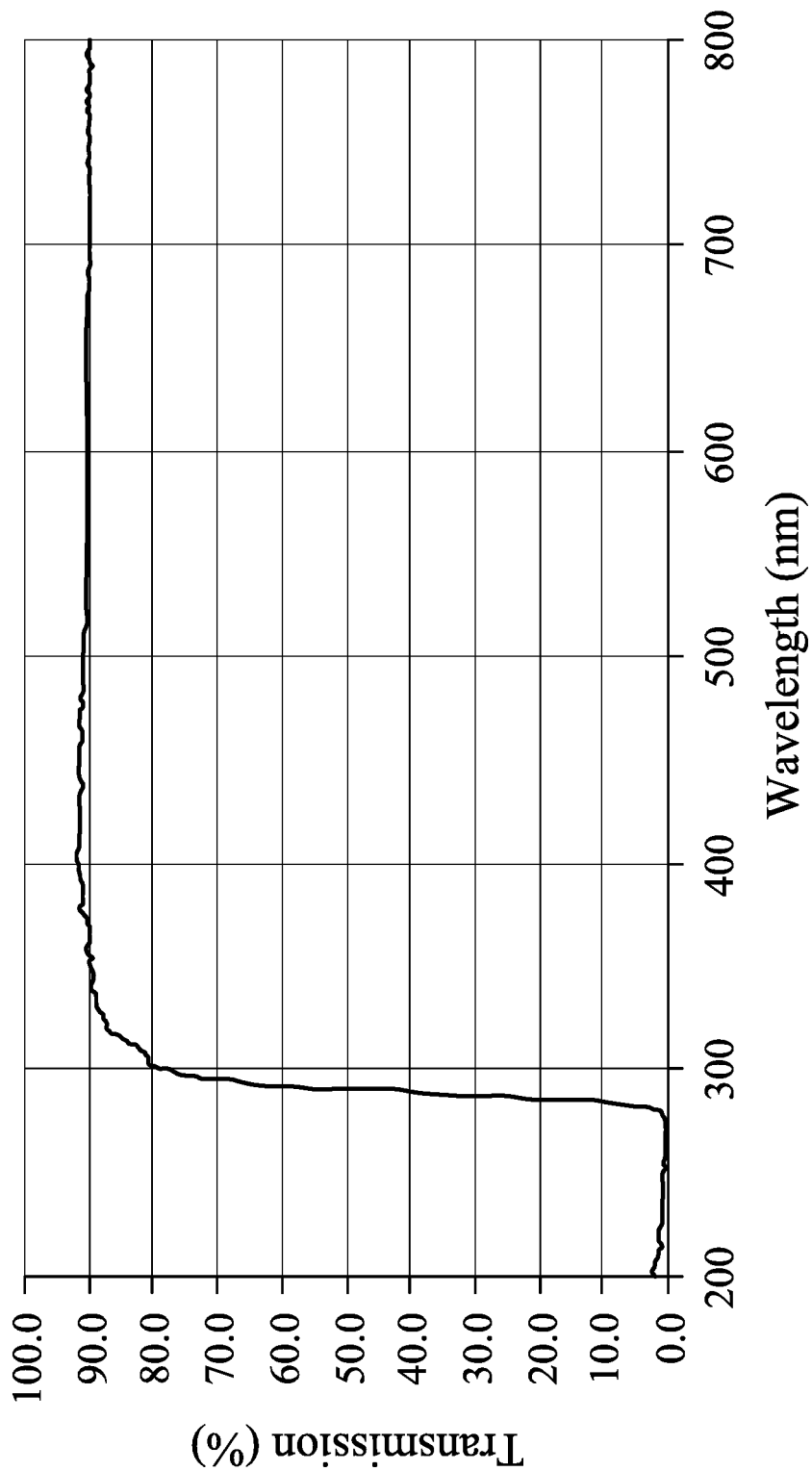
FIG. 19 shows a relationship of transmission and wavelength of Comparative Example 1.

FIG. 19 sows a relationship of transmission and wavelength of Comparative Example 1 according to the present disclosure. As shown in FIG. 19, the optical lens element of Comparative Example 1 cannot absorb a portion of UVB and cannot absorb UVA.

Table 20 is an optical lens element including a short-wavelength light absorbing agent according to another embodiment of the present disclosure, the names and the contents (shown in weight percentage) of the materials of the optical lens element are shown in Table 20.

TABLE 20

| | name | content (wt %) |
|---|---|---|
| plastic material | PC | 99.0 |
| short-wavelength light absorbing agent (commercial name) | Tinuvin 477 | 1.0 |

The total weight percentage of the short-wavelength light absorbing agent in the optical lens element is CSW. The values of CSW, WLT50, T3540, T4045, T4050, T5058, T5870 and T4042 are listed in Table 21. The definitions of WLT50, T3540, T4045, T4050, T5058, T5870 and T4042 are the same as that in Example 1, and are not repeated herein. The values in Table 21 are measured when a central thickness of the optical lens element equals to 0.25 mm.

TABLE 21

| CSW (%) | WLT50 (nm) | T4050 (%) | T5058 (%) | T5870 (%) | T3540 (%) | T4042 (%) | T4045 (%) |
|---|---|---|---|---|---|---|---|
| 1.00 | 450 | 39.0 | 73.9 | 85.0 | 0.06 | 1.81 | 16.92 |

Figure 20:
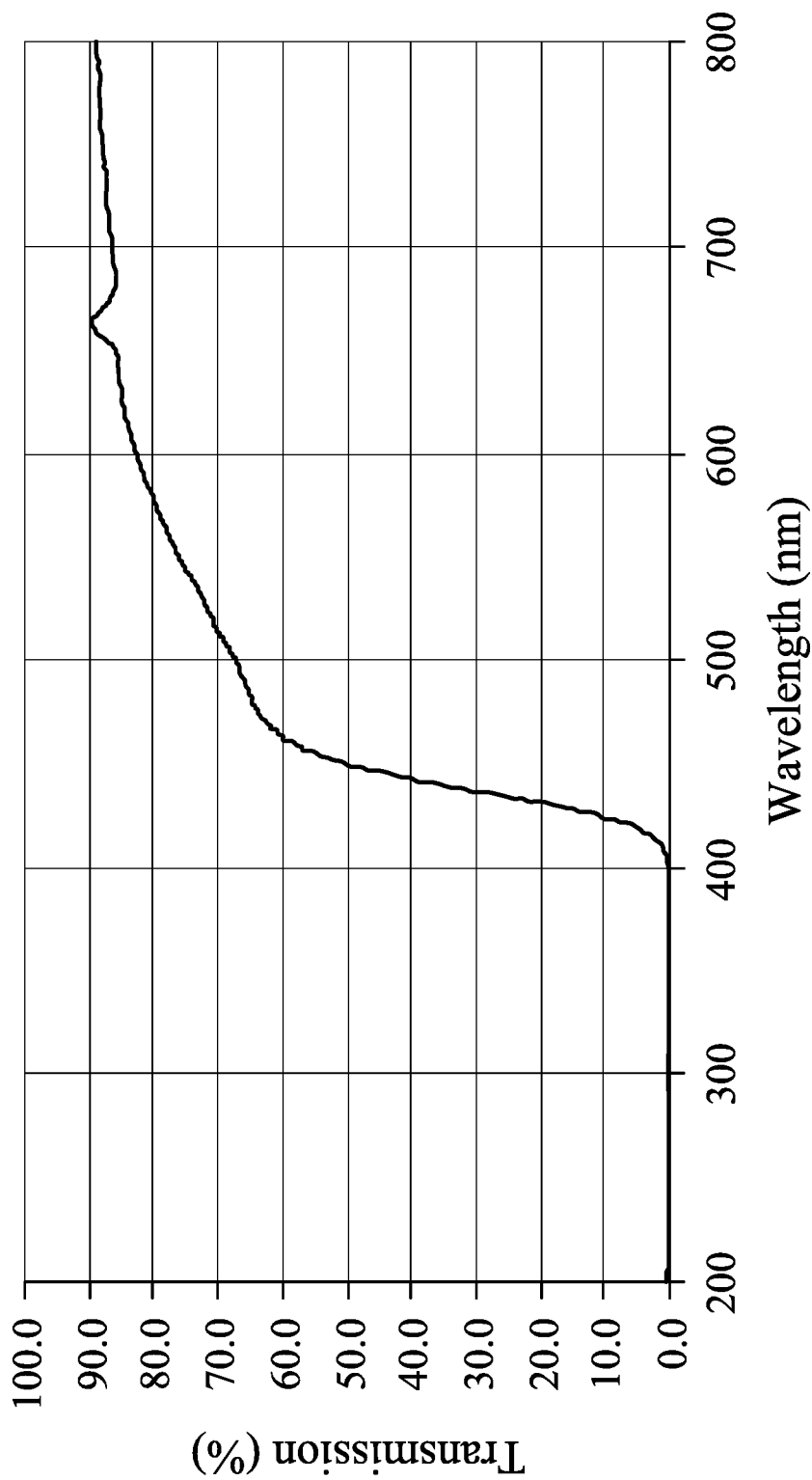
FIG. 20 shows a relationship of transmission and wavelength of an optical lens element including the short-wavelength light absorbing agent according to another embodiment of the present disclosure.

FIG. 20 shows a relationship of transmission and wavelength of the optical lens element including the short-wavelength light absorbing agent of Table 20. As shown in Table 21 and FIG. 20, the values of T3540, T4042 and T4045 of the optical lens element are 0.06%, 1.81% and 16.91%, respectively. Accordingly, the short-wavelength light absorbing effect can be improved depending on the demands.

Results of Fluorescence Spectrophotometer

Figure 21:
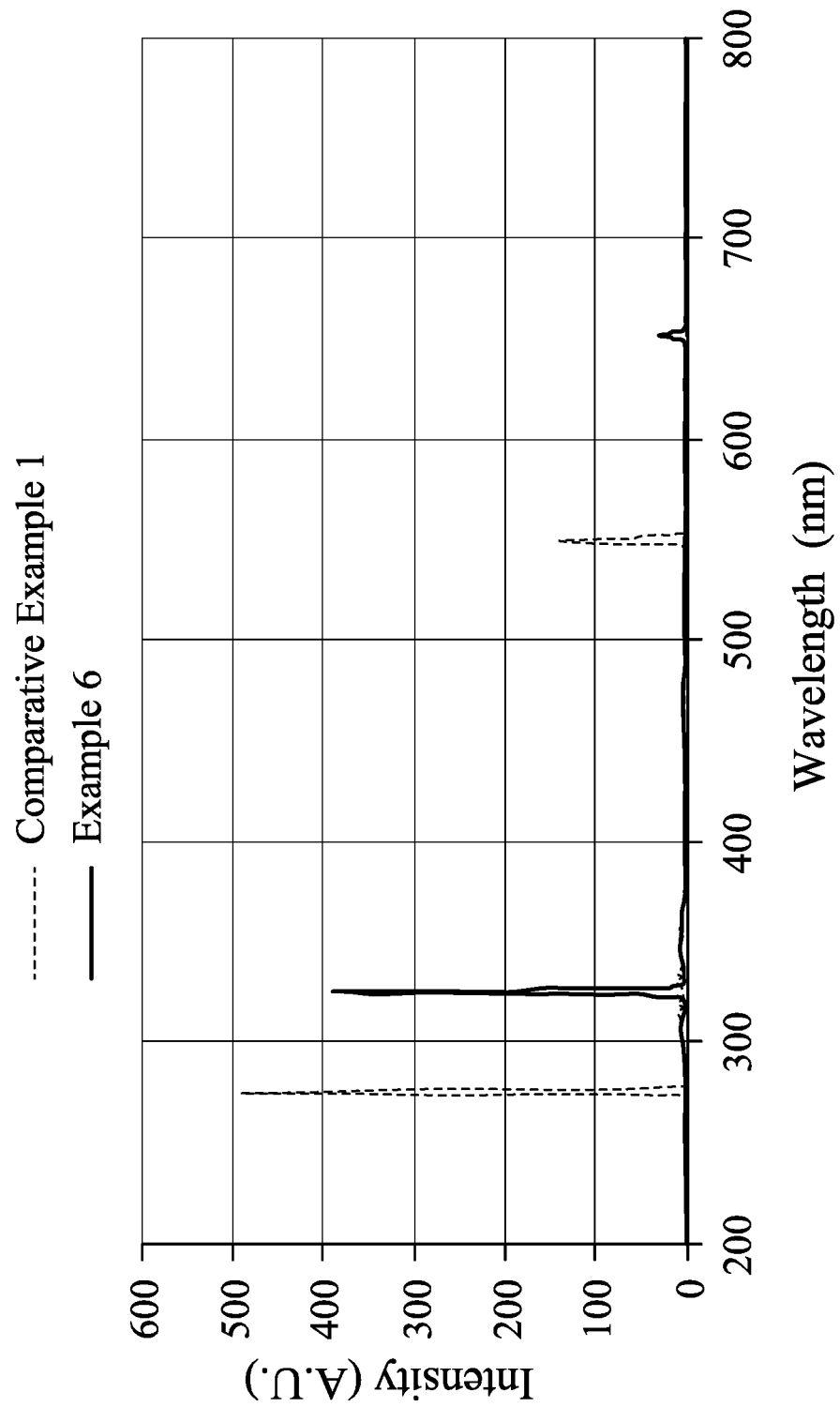
FIG. 21 shows results of fluorescence spectrophotometer of Example 6 and Comparative Example 1.

FIG. 21 shows results of fluorescence spectrophotometer of Example 6 and Comparative Example 1. The optical lens elements of Example 6 and Comparative Example 1 are measured with a UV spectrophotometer (Hitachi UV-4100) so as to obtain a wavelength correspondent to the maximum absorption peak. Then the optical lens elements of Example 6 and Comparative Example 1 are measured with a fluorescence spectrophotometer (Hitachi F-7000), the wavelength correspondent to the maximum absorption peak is used as the excitation wavelength and the detection range is 200 nm-800 nm. In FIG. 21, the result of fluorescence spectrophotometer of Comparative Example 1 shows two emission peaks, which are correspondent to the excitation wavelength and two times of the excitation wavelength of Comparative Example 1, and no other emission peaks are detected.

Similarly, the result of fluorescence spectrophotometer of Example 6 shows two emission peaks, which are correspondent to the excitation wavelength and two times of the excitation wavelength of Example 6, and no other emission peaks are detected. As shown in FIG. 21, the plastic material of the optical lens element of Comparative Example 1 is PC, which emits no fluorescence after irradiation with UV lights. The material of Example 6 can be regard as the plastic material of Comparative Example 1 plus the short-wavelength light absorbing agent, Omnistab 46. As shown in FIG. 21, the optical lens element of Example 6 also emits no fluorescence irradiation with UV lights, which shows the fluorescence problems are not caused by Omnistab 46, and the image quality can be maintained.

According to present disclosure, the optical lens element including the short-wavelength light absorbing agent has no side effect of emitting fluorescence after irradiation with UV lights.

Moreover, some plastic materials emit fluorescence after irradiation with UV lights, the fluorescence can be eliminated by adding specific short-wavelength light absorbing agents, such as the short-wavelength light absorbing agents disclosed in the present disclosure, so that the image quality of the optical image lens assembly can be enhanced. Examples of the plastic materials emitting fluorescence after irradiation with UV lights are EP6000, EP8000 or SP3810.

In the optical image lens assembly according to the present disclosure, the refractive index (N) and the Abbe number (V) are measured with a reference wavelength (d-line) at 587.6 nm. The transmittance (T) is measured by measuring a 3 mm test piece with homogeneous thickness by the ASTM D1003 method. The haze value (Hz) is measured by the ASTM D1003 method. And the glass transition temperature (Tg) is measured by the differential scanning calorimetry method (DSC).

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical image lens assembly comprising, in order from an object side to an image side:
at least seven optical lens elements made of a plastic material and at least one of a first optical lens element, a second optical lens element and a third optical lens element of the at least seven optical lens elements closest to the object side comprising at least one short-wavelength light absorbing agent, having refractive power, and being aspheric in at least one of an object-side surface and an image-side surface thereof, and the short-wavelength light absorbing agent being homogeneously mixed with the plastic material;
wherein the first optical lens element of the at least seven optical lens elements closest to the object side has positive refractive power, one of the at least seven optical lens elements closest to the image side does not comprise the short-wavelength light absorbing agent, and there is no optical lens element having refractive power between the first optical lens element and an object;
wherein an average transmittance in a wavelength range of 350 nm-400 nm of the at optical lens element comprising the short-wavelength light absorbing agent is T3540, an average transmittance in a wavelength range of 400 nm-450 nm of the optical lens element comprising the short-wavelength light absorbing agent is T4045, an average transmittance in a wavelength range of 500 nm-580 nm of the optical lens element comprising the short-wavelength light absorbing agent is T5058, a maximum thickness of the optical lens element comprising the short-wavelength light absorbing agent is TKmax, a minimum thickness of the optical lens element comprising the short-wavelength light absorbing agent is TKmin, a maximum of a maximum effective diameter of the optical lens element comprising the short-wavelength light absorbing agent is Φmax, a sum of a central thickness of the optical lens element comprising the short-wavelength light absorbing agent is sumCTa, and the following conditions are satisfied:

$T3540 \leq 40\%$;

$T4045 < 90\%$;

$90\% \leq T5058$;

$1.0 < TKmax/TKmin$; and $0.49 \leq \Phi max/sumCTa \leq 10$.

2. The optical image lens assembly of claim 1, wherein the plastic material is thermoplastic.

3. The optical image lens assembly of claim 2, wherein the plastic material is polycarbonate.

4. The optical image lens assembly of claim 2, wherein a central thickness of optical lens element comprising the short-wavelength light absorbing agent is CTa, and the following condition is satisfied:

$CTa \leq 1.5$ mm.

5. The optical image lens assembly of claim 2, wherein a glass transformation temperature of the plastic material is Tg, and the following condition is satisfied:

$131° C. \leq Tg \leq 165° C.$

6. The optical image lens assembly of claim 2, wherein a transmittance of optical lens element comprising the short-wavelength light absorbing agent is T, and the following condition is satisfied:

$90\% \leq T$.

7. The optical image lens assembly of claim 2, wherein an Abbe number of the optical lens element comprising the short-wavelength light absorbing agent is V, and the following condition is satisfied:

$15.0 \leq V \leq 37.5$.

8. The optical image lens assembly of claim 2, wherein a haze value of the optical lens element comprising the short-wavelength light absorbing agent is Hz, and the following condition is satisfied:

$0.3\% \leq Hz \leq 0.5\%$.

9. The optical image lens assembly of claim 2, wherein a refractive index of the optical lens element comprising the short-wavelength light absorbing agent is N, and the following condition is satisfied:

$1.6 \leq N$.

10. The optical image lens assembly of claim 1, wherein the short-wavelength light absorbing agent is an organic compound.

11. The optical image lens assembly of claim 1, wherein the optical lens element comprising the short-wavelength light absorbing agent is made by an injection molding process.

12. The optical image lens assembly of claim 1, wherein an average transmittance in a wavelength range of 400 nm-500 nm of the optical lens element comprising the short-wavelength light absorbing agent is T4050, and the following condition is satisfied:

$65\% \leq T4050$.

13. The optical image lens assembly of claim 1, wherein the maximum thickness of the optical lens element comprising the short-wavelength light absorbing agent is TKmax, the minimum thickness of the optical lens element comprising the short-wavelength light absorbing agent is TKmin, and the following condition is satisfied:

$1.0 < TKmax/TKmin \leq 2.0$.

14. The optical image lens assembly of claim 1, wherein an average transmittance in a wavelength range of 580 nm-700 nm of the optical lens element comprising the short-wavelength light absorbing agent is T5870, and the following condition is satisfied:

$85\% \leq T5870$.

15. The optical image lens assembly of claim 1, wherein an average transmittance in a wavelength range of 400 nm-420 nm of optical lens element comprising the short-wavelength light absorbing agent is T4042, and the following conditions are satisfied:

$T4042 \leq 50\%$.

16. A plastic material for manufacturing the at least one of the first optical lens element, the second optical lens element and the third optical lens element of the at least seven optical lens elements closest to the object side of the optical image lens assembly of claim 1, wherein an average transmittance in a wavelength range of 400 nm-500 nm of the optical lens element made by the plastic material is T4050, an average transmittance in a wavelength range of 580 nm-700 nm of the of optical lens element made by the plastic material is T5870, and the following conditions are satisfied:

$20\% \leq T4050$; and $60\% \leq T5870$.

17. An optical image lens assembly comprising, in order from an object side to an image side:
at least seven optical lens elements made of a plastic material and at least one of a first optical lens element, a second optical lens element and a third optical lens element of the at least seven optical lens elements closest to the object side comprising at least one short-wavelength light absorbing agent, having refractive power, and being aspheric in at least one of an object-side surface and an image-side surface thereof, and the short-wavelength light absorbing agent being homogeneously mixed with the plastic material;
wherein the first optical lens element of the at least seven optical lens elements closest to the object side has positive refractive power, one of the at least seven optical lens elements closest to the image side does not comprise the short-wavelength light absorbing agent, and there is no optical lens element having refractive power between the first optical lens element and an object;

wherein an average transmittance in a wavelength range of 350 nm-400 nm of the optical lens element comprising the short-wavelength light absorbing agent is T3540, an average transmittance in a wavelength range of 400 nm-450 nm of the two optical lens element comprising the short-wavelength light absorbing agent is T4045, a maximum thickness of the two optical lens element comprising the short-wavelength light absorbing agent is TKmax, a minimum thickness of the optical lens element comprising the short-wavelength light absorbing agent is TKmin, an average transmittance in a wavelength range of 500 nm-580 nm of the at least one of the at least two optical lens elements comprising the short-wavelength light absorbing agent is T5058, a maximum of a maximum effective diameter of the optical lens element comprising the short-wavelength light absorbing agent is (Φ)max, a sum of a central thickness of the optical lens element comprising the short-wavelength light absorbing agent is sumCTa, and the following conditions are satisfied:

$T3540 \leq 40\%$;

$T4045 < 90\%$;

$1.0 < TKmax/TKmin \leq 2.0$;

$90\% \leq T5058$; and $0.49 \leq \Phi max/sumCTa \leq 10$.

18. The optical image lens assembly of claim 17, wherein the sum of the central thickness of the optical lens element comprising the short-wavelength light absorbing agent is sumCTa, a sum of a central thickness of the at least seven optical lens elements is sumCT, and the following condition is satisfied:

19. The optical image lens assembly of claim 17, wherein at least four of the at least seven optical lens elements have refractive power.

20. The optical image lens assembly of claim 17, where the the optical lens element comprising the short-wavelength light absorbing agent is the second optical lens element or the third optical lens element among the optical lens element in order from the object side to the image side.

21. The optical image lens assembly of claim 17, wherein the maximum of the maximum effective diameter of the optical lens element comprising the short-wavelength light absorbing agent is Φmax, and the following condition is satisfied:

$0.50 \text{ mm} \leq \Phi max \leq 60.00 \text{ mm}$.

22. The optical image lens assembly of claim 17, wherein the maximum of the maximum effective diameter of the optical lens element comprising the short-wavelength light absorbing agent is Φmax, the sum of the central thickness of the optical lens element comprising the short-wavelength light absorbing agent is sumCTa, and the following condition is satisfied:

$2 \leq \Phi max/sumCTa \leq 10$.

23. An image capturing apparatus, comprising:
the optical image lens assembly of claim 17; and
an image sensor disposed on an image surface of the optical image lens assembly.

24. An electronic device, which is a mobile photographing device, comprising:
the image capturing apparatus of claim 23.

25. An electronic device, which is a portable device, comprising:
the image capturing apparatus of claim 23.

* * * * *